(12) United States Patent
Plummer

(10) Patent No.: US 11,187,332 B2
(45) Date of Patent: Nov. 30, 2021

(54) BREAK-AWAY CHECK VALVE

(71) Applicant: Melvin Plummer, Los Angeles, CA (US)

(72) Inventor: Melvin Plummer, Los Angeles, CA (US)

( * ) Notice: Subject to any disclaimer, the term of this patent is extended or adjusted under 35 U.S.C. 154(b) by 116 days.

(21) Appl. No.: 16/382,124

(22) Filed: Apr. 11, 2019

(65) Prior Publication Data

US 2020/0326001 A1    Oct. 15, 2020

(51) Int. Cl.
*E03B 9/02* (2006.01)
*F16K 15/03* (2006.01)

(52) U.S. Cl.
CPC .............. *F16K 15/038* (2013.01); *E03B 9/02* (2013.01)

(58) Field of Classification Search
CPC .............. Y10T 137/87973; F16L 29/02; F16L 29/04; F16L 37/36; F16L 37/373; F16L 37/44; F16L 37/47; F16L 55/1007; E03B 9/02; E03B 9/04; F16K 1/221; F16K 1/223; F16K 15/038; F16K 15/181; F16K 27/0218; F16K 17/363
See application file for complete search history.

(56) References Cited

U.S. PATENT DOCUMENTS

| | | | | | |
|---|---|---|---|---|---|
| 4,361,165 | A | * | 11/1982 | Flory | F16K 17/40 137/614.02 |
| 4,699,357 | A | * | 10/1987 | Sisk | F16K 27/0218 137/315.17 |
| 5,738,143 | A | * | 4/1998 | Faughn | F16L 37/373 137/614.03 |
| 2009/0025798 | A1 | * | 1/2009 | Garcia | E03B 9/10 137/296 |
| 2015/0240962 | A1 | * | 8/2015 | Plummer | E03B 9/02 137/300 |
| 2016/0265197 | A1 | * | 9/2016 | Kitchen | F16K 17/40 |
| 2017/0307097 | A1 | * | 10/2017 | Plummer | F16K 15/036 |
| 2018/0171606 | A1 | * | 6/2018 | Kitchen | F16K 17/363 |
| 2020/0256474 | A1 | * | 8/2020 | Huelsman | F16K 17/363 |

* cited by examiner

*Primary Examiner* — Hailey K. Do
(74) *Attorney, Agent, or Firm* — Cohen IP Law Group, P.C.; Michael N. Cohen

(57) ABSTRACT

A break-away check valve is disclosed. The check valve may be configured between two passageways and may regulate the flow of liquid between the passageways. The check valve may include an actuation assembly that may actuate the check valve upon the system becoming dislodged or otherwise dislocated from at least one of the passageways.

18 Claims, 41 Drawing Sheets

VIEW OF DATA GUARD EMBODIMENT

BREAK-AWAY CHECK VALVE

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE DISCLOSURE

The present invention relates generally to check valves, and more particularly to check valves that may be used with fire hydrants.

DISCUSSION OF RELATED ART

Presently, a variety of dual-plate check valves are available in the market. However, none of them provide any type of fast-locking mechanism or actuation principles which are installed completely above grade, within a single flange and resettable in the field. Moreover, most of the existing devices are complex in use, design and are expensive to install below grade (underground). Due to these problems, the check valves presently in use have not been very popular.

One of the existing devices provides a slow valve closing feature when the fire hydrant and/or pipes are damaged. In an attempt to diminish water hammer which is caused when large amounts of flowing water is stopped causing a back pressure which can damage piping downstream. All of these conventional check valve devices require them to be installed below grade or within the water main piping requiring expensive installation and unacceptable water flow restrictions.

Therefore, there is a need for a dual plate check valve. Such a needed device would be simple, cost effective, constructed entirely of stainless steel and would function over a long period of time without any maintenance. Further, such a needed device would provide a fast-locking mechanism to prevent a large amount of water/fluid loss when fire hydrants and/or pipelines are damaged by vehicles or other forces. Such a needed device would have an emergency warning system to alert individuals when the fire hydrants and/or pipelines are damaged. The dual plate check valve assembly or companion flange can also incorporate electronic sensing devices relaying real time data on fluid pressure, quality, audio and video images and movement. Moreover, such a device would include a fluid back flow prevention system to prevent contamination of the water/fluid system. Such a device would be easy to install under wet barrel fire hydrants and/or in line with pipelines and would be reinstalled or replaced under or in line with an existing fire hydrant and/or pipeline. The device will minimize the need for first responders to be exposed to hazardous situations. The above ground and resettable in the field device eliminates the need to replace the device as it also reduces property damage caused by the inundation of water or fluids. The device incorporates several proprietary designs which may be patentable as singular inventions. They are incorporated in this one application to describe its utility in the fluid flow/fire hydrant application and are not limited to other applications. Finally, such a needed device would reduce the cost of collateral damage caused by water and/or fluids gushing from damaged pipes. The present embodiment accomplishes these objectives.

SUMMARY OF THE DISCLOSURE

In one exemplary embodiment hereof, a system for controlling a valve assembly may comprise a housing with a top portion, a bottom portion, and an opening configured between the top portion and the bottom portion; the valve assembly may be configured within the opening; an actuation assembly may be configured with the valve assembly; an attachment assembly may be configured to attach the top portion to a first passageway and the bottom portion to a second passageway; and wherein the attachment assembly may be attached the top portion to the first passageway and the bottom portion to the second passageway, and the actuation assembly may actuate the valve assembly upon the at least partial detachment of the top portion from the first passageway and/or the at least partial detachment of the bottom portion from the second passageway.

In one aspect of the system, the valve assembly may include a first valve plate configured with a first valve hub, and a second valve plate configured with a second valve hub.

In another aspect of the system, the actuation assembly may include a first keeper pin configured with the first valve hub, and a second keeper pin configured with the second valve hub.

In another aspect of the system, the first valve hub may include a first keeper pin area configured to be held secure in a first at least one direction when the first keeper pin is in its downward position, and/or the second valve hub may include a second keeper pin area configured to be held secure in a second at least one direction when the second keeper pin is in its downward position.

In another aspect of the system, the first keeper pin area may be free to move in the first at least one direction when the first keeper pin is in its upward position, and/or the second keeper pin area may be free to move in the second at least one direction when the second keeper pin is in its upward position.

In another aspect of the system, the first keeper pin may transition from its downward position to its upward position upon the at least partial detachment of the top portion from the first passageway, and/or the second keeper pin may transition from its downward position to its upward position upon the at least partial detachment of the top portion from the first passageway.

In another aspect of the system, the attachment assembly may include flange holes with side slots.

In another aspect of the system, the first valve plate and the first valve hub may be constructed as a single unit, and/or the second valve plate and the second valve hub may be constructed as a single unit.

In another exemplary embodiment hereof, a method of regulating the flow of a liquid from a first passageway to a second passageway may comprise: (A) providing a valve assembly attached between the first passageway and the second passageway; (B) providing an actuation assembly configured with the valve assembly; (C) using the actuation assembly to sense the at least partial detachment of the valve assembly from the first passageway and/or the at least partial detachment of the valve assembly from the second passageway; and (D) using the actuation assembly to actuate the valve assembly.

In one aspect of the method, the actuation assembly may include at least one keeper pin and the sensing in (C) may be provided by the at least one keeper pin.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTIONS OF PREFERRED EMBODIMENTS

The following describes example embodiments in which the present invention may be practiced. This invention, however, may be embodied in many different ways, and the description provided herein should not be construed as limiting in any way.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

A system or framework 10 according to exemplary embodiments hereof is described here with reference to the FIGS. 1, 2, 2A, and 3-29.

In general, the system 10 may include a device, mechanism or system that may stop, regulate and/or control the flow of a fluid, liquid or gas through a passageway such as a pipe, water main, hydrant, tube, hose, conduit, pipeline, duct, channel or other type of passageway. The system 10 may also include a device, mechanism or system that may stop, regulate and/or control the flow of a fluid, liquid or gas between any combinations of passageways, and/or through any junctions between any passageways or combinations of passageways.

Figure 1:
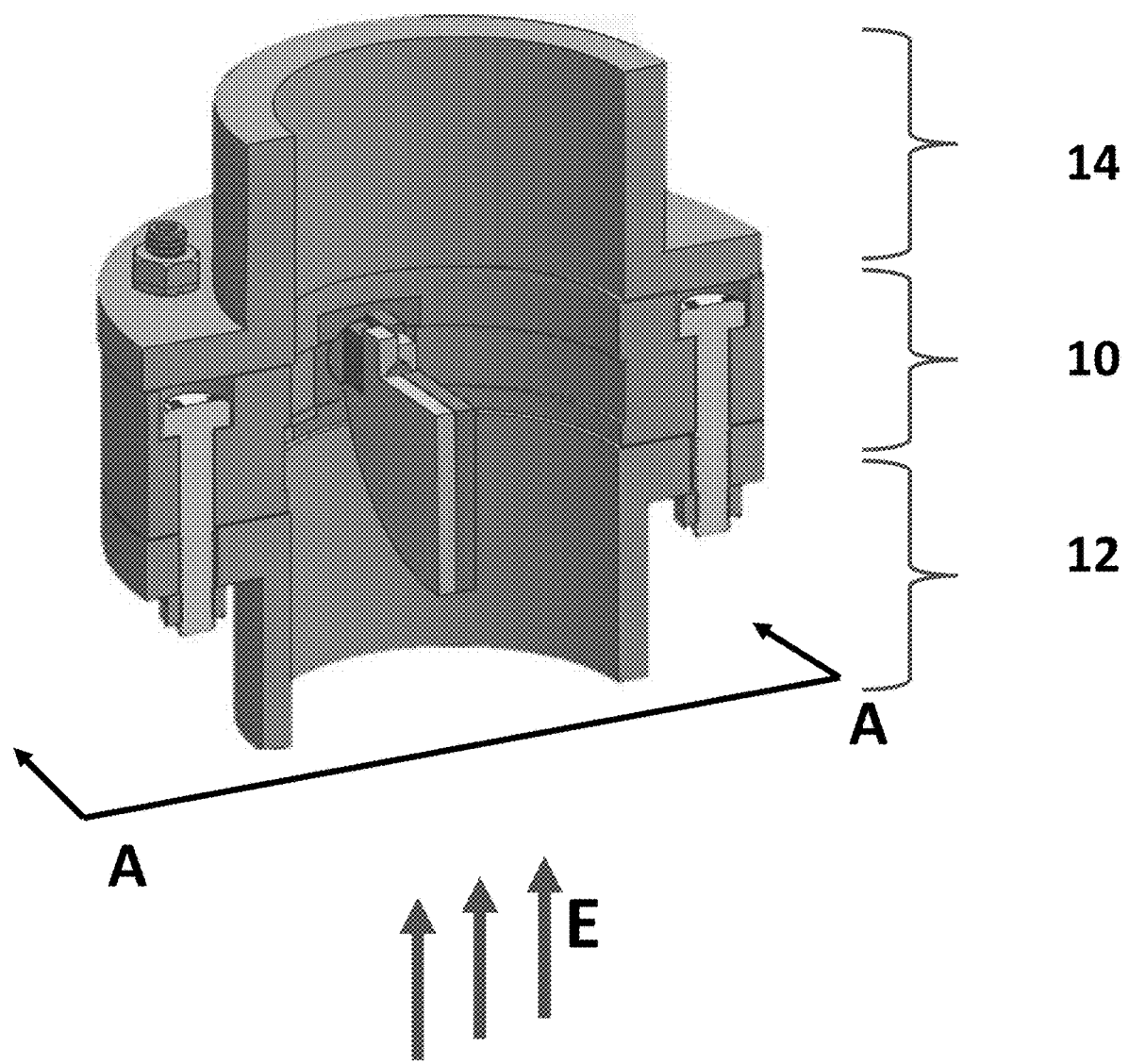
FIGS. 1-2 show aspects of a breakaway check valve according to exemplary embodiments herein.

For example, according to one exemplary embodiment as shown in FIG. 1, the system 10 may be configured between a first water passageway 12 and a second water passageway 14 and may control the water flow there through. In this case, the system 10 may include one or more valves (e.g., variable valves, check valves, stop valves, etc.) that may be positioned between the first water passageway 12 and the second water passageway 14, and the one or more valves may control the flow of water between the two 12, 14.

In one example of this type, the first water passageway 12 may be a water main pipeline 12, the second water passageway 14 may be a fire hydrant 14, and the system 10 may be configured between the water main 12 and the hydrant 14. In this example, the system 10 may include a break-off check valve that may stop the flow of water from the water main 12 to the hydrant 14 in the event of the hydrant 14 becoming dislocated and/or dislodged (partially or completely) from the water main 12 and/or the system 10 (e.g., in the event of an accident between an automobile and the hydrant 14).

In another example, the first water passageway may be a first section of a water delivery pipe 12 and the second water passageway may be a second section of a water delivery pipe 14, and the system 10 may regulate the flow of water between the first and second water delivery pipes 12, 14.

Figure 2:
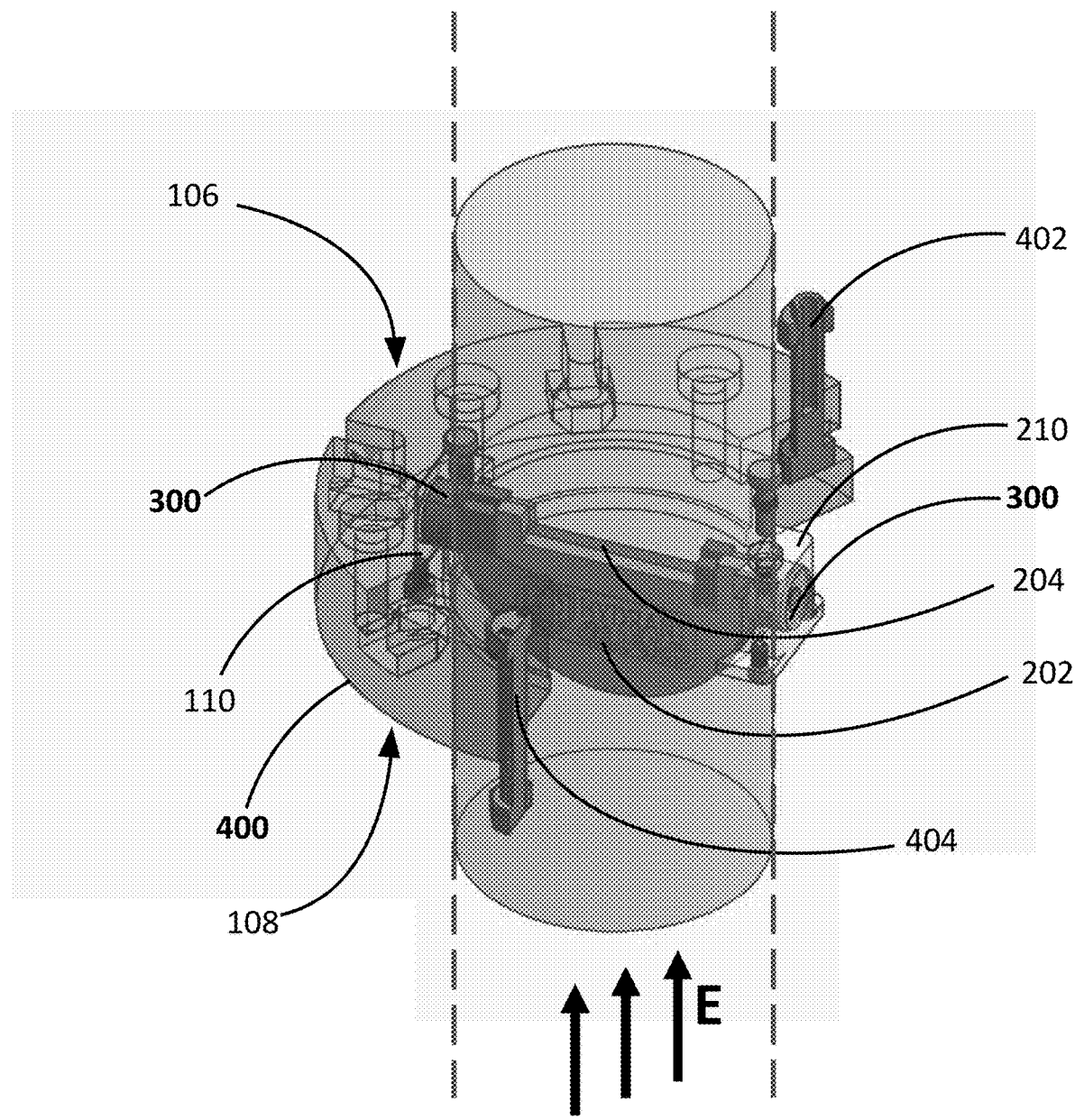

As shown in FIG. 2 (cut-away view of the system 10 along the cut lines A-A of FIG. 1), in one exemplary embodiment hereof the system 10 may include a housing assembly 100, a valve assembly 200, an actuation assembly 300, and an attachment assembly 400. The system 10 may also include other elements as necessary for the system 10 to perform its functionalities. The details of the assemblies 100, 200, 300, 400 will be given in other sections. In addition, the relative sizes, positions and orientations of the assemblies 100, 200, 300, 400 as shown may not reflect the actual relative sizes, positions or orientations of the assemblies 100, 200, 300, 400, and the assemblies 100, 200, 300, 400 may be configured in any way as required by the system 10.

For the purpose of this specification and for demonstration, the system 10 and its use will be described in relation to a water main pipeline 12 and a fire hydrant 14 as described in the example above. However, it will be understood by a person of ordinary skill in the art, upon reading this specification, that the system 10 may be installed, configured, mounted, integrated or generally utilized by any types of fluid or gas passageways that may benefit from the system 10. It is understood that the scope of the system 10 is not limited in any way by the passageway(s) with which the system 10 may be utilized or configured.

Figure 2A:
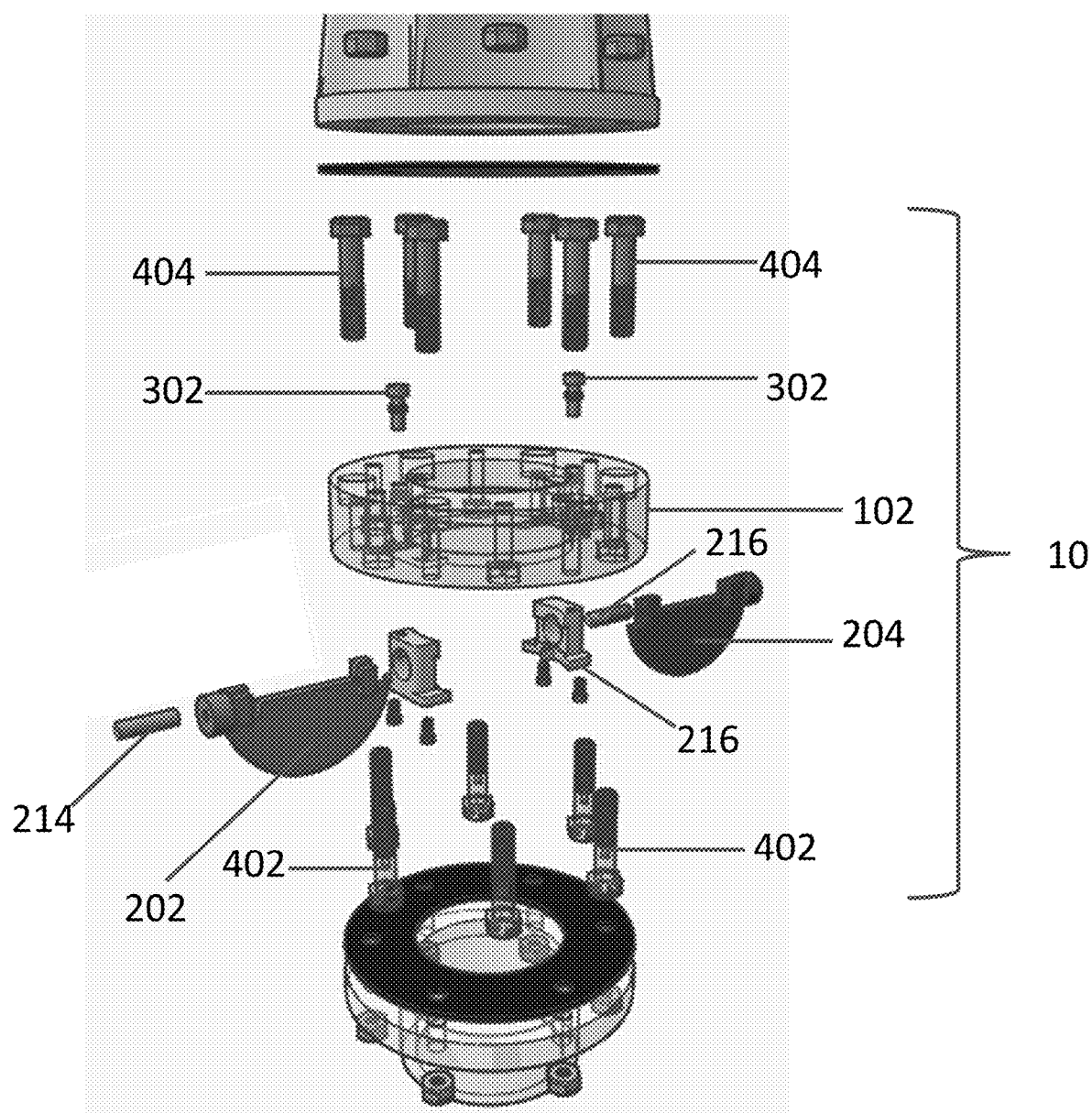
FIG. 2A shows an exploded view of aspects of a breakaway check valve according to exemplary embodiments herein.

FIG. 2A shows an exploded view of the system 10 according to exemplary embodiments hereof.

System Overview

In one exemplary embodiment hereof, the system 10 may be generally configured between the water main 12 and the fire hydrant 14, and when secured, may regulate the flow of water from the water main 12 to the hydrant 14. The housing 100 may include a barrel 102 with an inner opening 104 (depicted by the dashed lines in FIG. 2) that may extend from one side of the barrel 102 (e.g., the top side 106) to a second side of the barrel 102 (e.g., the bottom side 108). The valve assembly 200 may be configured within the opening 104 within the barrel 102, and may regulate the water flow there-through. In this example, with the valve assembly 200 fully or at least partially open, the water may flow from the water main 12 through the valve 200 and into the hydrant 14. Conversely, with the valve assembly 200 closed, the water may not flow through the barrel 102.

The system 10 may be secured to the water main 12 and to the hydrant 14 by the attachment assembly 400. In one preferred embodiment, the attachment assembly 400 may include bolts and/or break-away bolts as will be described in other sections. Other types of attachment mechanisms may also be used.

The actuating assembly 300 may actuate or otherwise control the valve assembly 200. In one exemplary embodiment hereof, the actuating assembly 300 may hold the valve assembly 200 in a generally open configuration (so that water may flow through the barrel 102), and then when triggered, may cause the valve assembly 200 to transition from an open configuration to a closed configuration (so that water may not flow through the barrel 102).

In one exemplary embodiment hereof, the actuating assembly 300 may be triggered to close the valve assembly 200 upon the detachment (partial or complete) of the system 10 from the water main 12, the hydrant 14, or any combination thereof. For example, if an automobile were to collide with the hydrant 14, causing the hydrant 14 to become separated or otherwise detached from the barrel 102 (e.g., the break-away bolts of the attachment assembly 400 may break causing the attachment assembly 400 to release the hydrant 14) the actuating assembly 300 may trigger the valve assembly 200 to close so that water may no longer flow through the system 10. In this way, water may not flow out the broken junction between the system 10 and the hydrant 14.

Additional details regarding the assemblies 100, 200, 300, 400 and the configuration of the system 10 with a water main pipeline 12 and a fire hydrant 14 (or other types of passageways) will be described in further detail.

Housing Assembly

Figure 3:
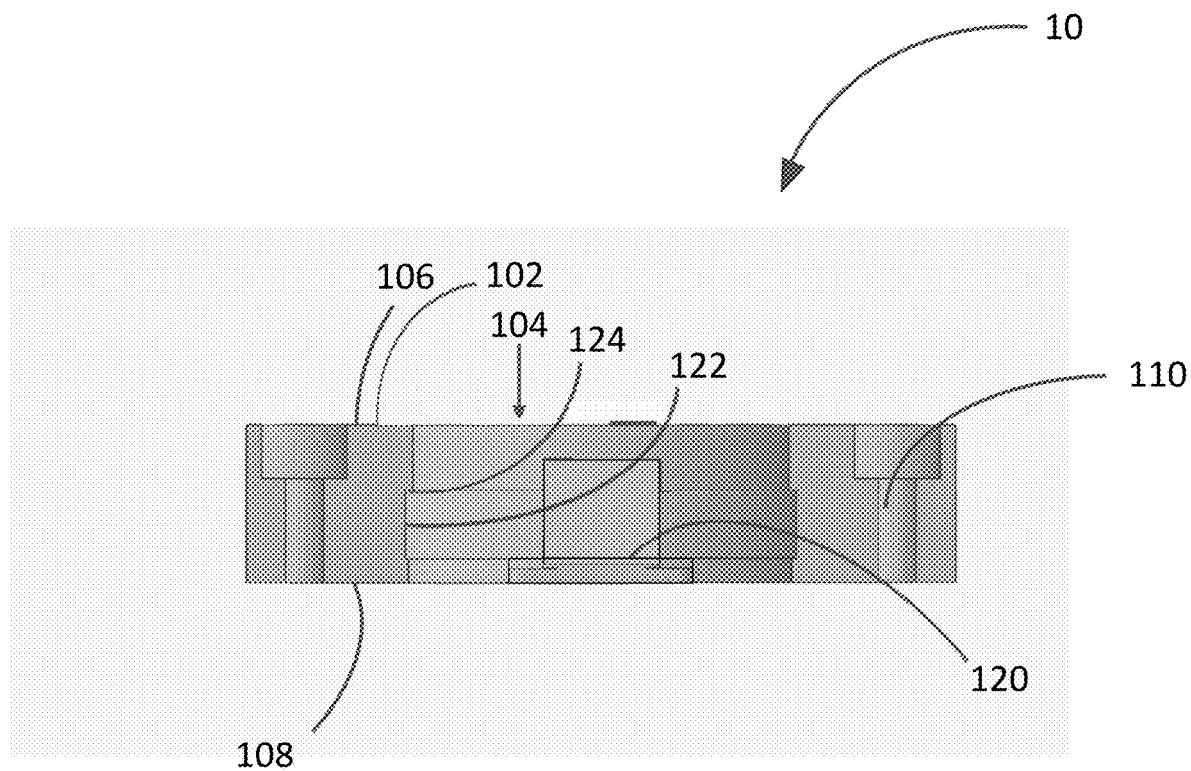
FIGS. 3-5 show aspects of a housing assembly according to exemplary embodiments herein.
Figure 4:
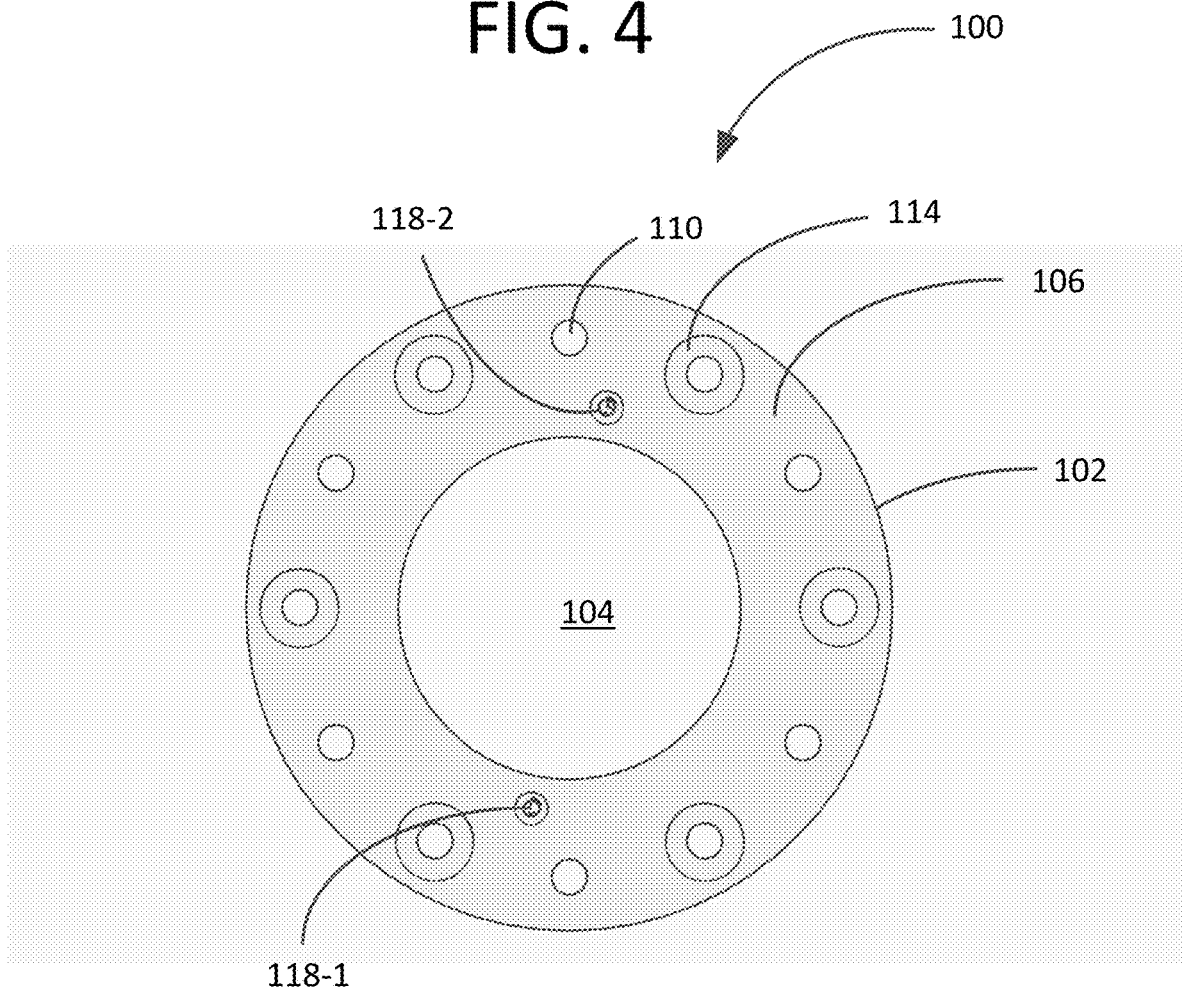
Figure 5:
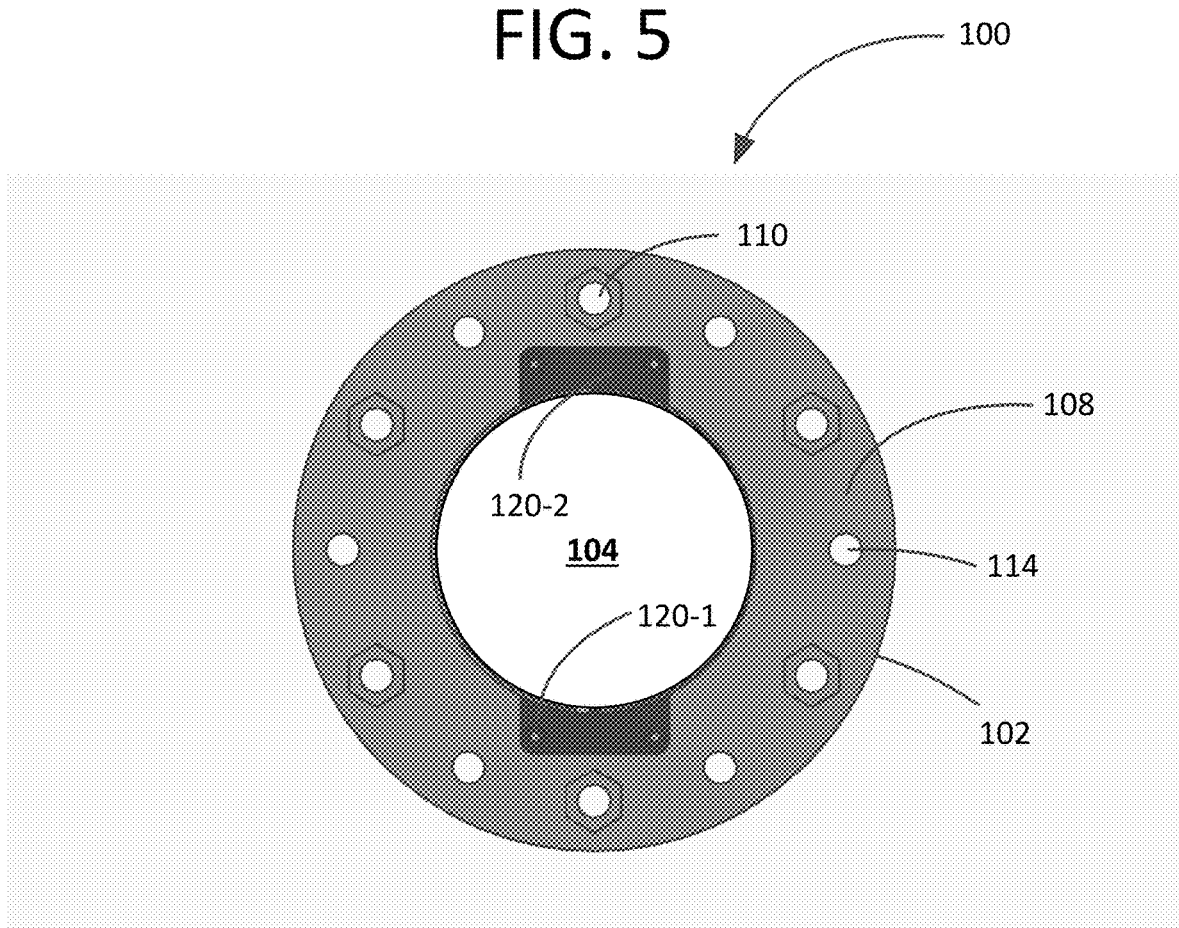
Figure 6:
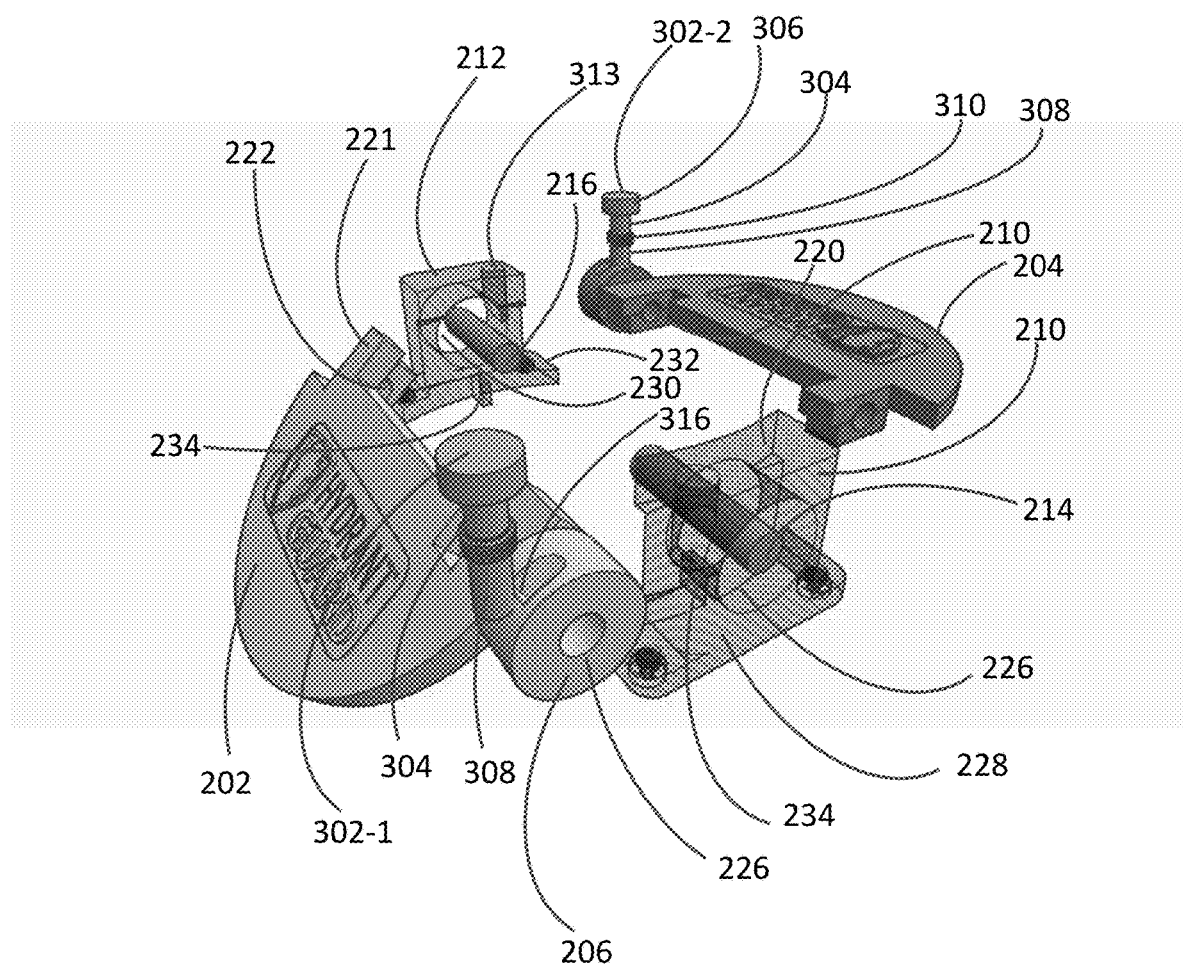
FIG. 6-9 show aspects of a valve assembly according to exemplary embodiments herein.

In one exemplary embodiment hereof as shown in FIG. 3 (cut-away view of the housing 100 along cut lines A-A of FIG. 10), FIG. 4 and FIG. 5, the housing assembly 100 may include a barrel 102 with an inner opening 104 that may extend from one side of the barrel 102 (e.g., the top side 106) to a second side of the barrel 102 (e.g., the bottom side 108). It may be preferable that the inner opening 104 be generally centered with respect to the outer circumference of the barrel 102, but this may not be required. It may also be preferable that the opening 104 have a generally constant radius from the top 106 to the bottom 108 (with the exception of the valve sealing surface 122 as will be described in other sections), but this may not be required.

The barrel 102 may include upper mounting flange holes 110 that may receive and house upper mounting bolts 402, and lower mounting flange holes 114 that may receive and house lower mounting bolts 404. As will be described in other sections, the upper mounting bolts 402 may secure the upper portion 106 of the system 10 to the fire hydrant 14, and the lower mounting bolts 404 may secure the lower portion 108 of the system 10 to the water main 12.

In one exemplary embodiment hereof, the barrel 102 may include one or more keeper pin flange holes 118 that may be configured with one or more keeper pins 302 respectively. The keeper pins 302 will be described in other sections.

The barrel 102 may also include one or more valve holder areas 120 positioned on the inner circumferential surface of the opening 104 within the barrel 102 that may receive and secure the valve assembly 200 within the opening 104. In one preferred embodiment hereof, each valve holder area 120 may include a recess or slot that may receive and secure a valve holder 210, 212 (as will be described in other sections). However, the valve holder areas 120 may be flush with the inner surface of the opening 104 or otherwise. It may be preferable that the barrel 102 include two valve holder areas 120 opposite from one another within the opening 104 such that the holder areas 120 may receive and secure the valve holders 210, 212 respectively as the valve assembly 200 may generally extend across the opening 104. This will be described in other sections.

In one exemplary embodiment hereof, the opening 104 may include a valve sealing surface 122 about its inner circumference that may seal the valve assembly 200 within the opening 104 when the valve assembly 200 may be in a closed configuration. In this way, the valve sealing surface 122 may ensure a sealed junction between the valve assembly 200 and the opening 104 without leaks, gaps or disjoints so that no water may pass through the valve assembly 200 when the assembly 200 is in the closed position.

The valve sealing surface 122 may include a rim or lip that may extend circumferentially about the inner surface of the opening 104. As such, the rim or lip of the valve sealing surface 122 may include a downward facing surface 124 that may make contact with the valve plates when the valve plates are in the closed position. This will be described in further detail in other sections.

Valve Assembly

In one exemplary embodiment hereof as shown in FIGS. 6-9, the system 10 may include a valve assembly 200. The valve assembly 200 may include without limitation a front valve plate 202, a back valve plate 204, a front valve hub 206, a back valve hub 208, a front valve holder 210, a back valve holder 212, a front alignment pin 214 and a back alignment pin 216. In addition, the front valve hub 206 may include a front pin hole 218, and the back valve hub 208 may include a back pin hole 220. Also, the front valve plate 202 may include a second front section 221 with a second front alignment pin hole 222, and the back valve plate 204 may include a second back section 223 with a second back alignment hole 224.

Figure 7:
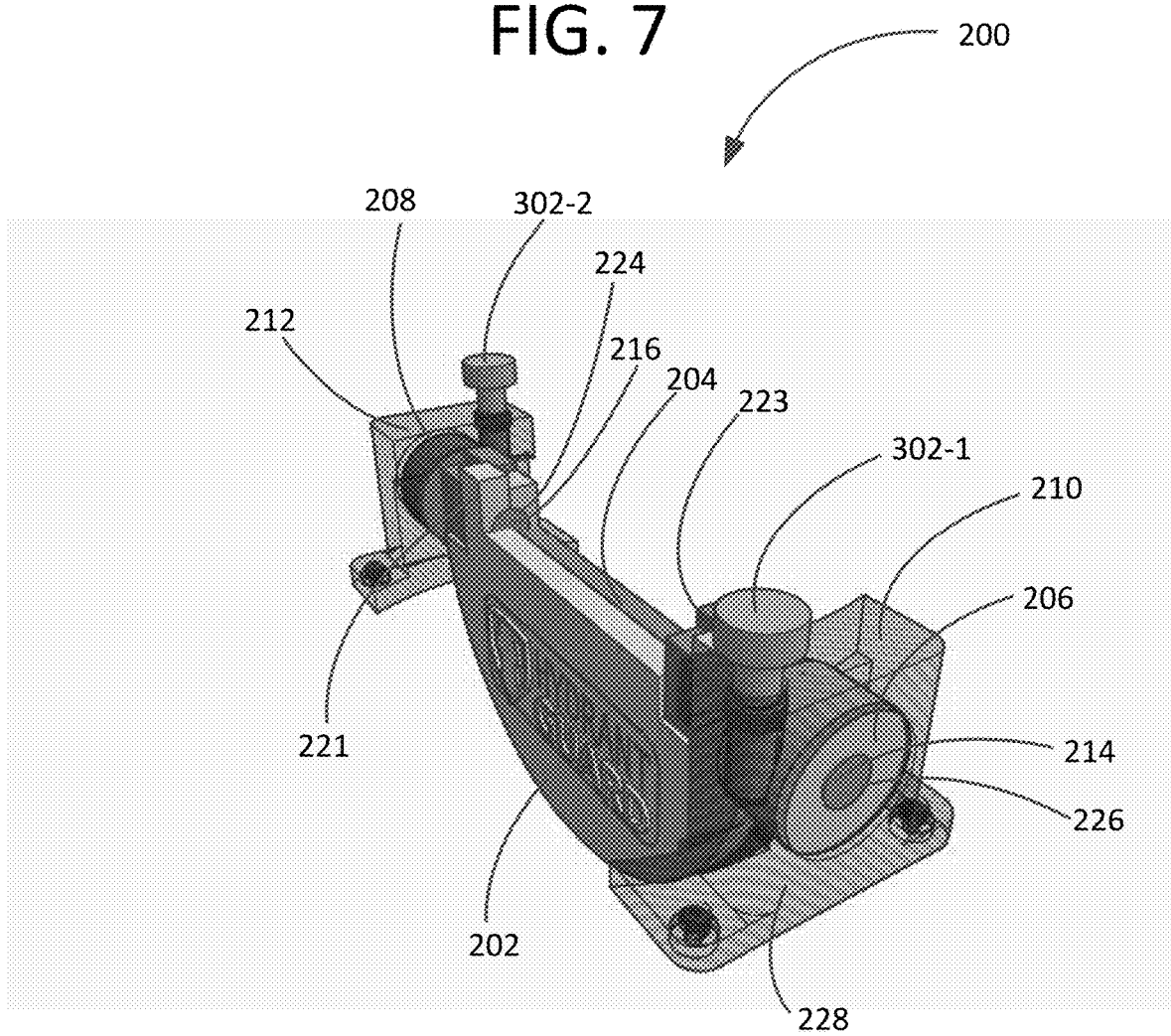
Figure 8:
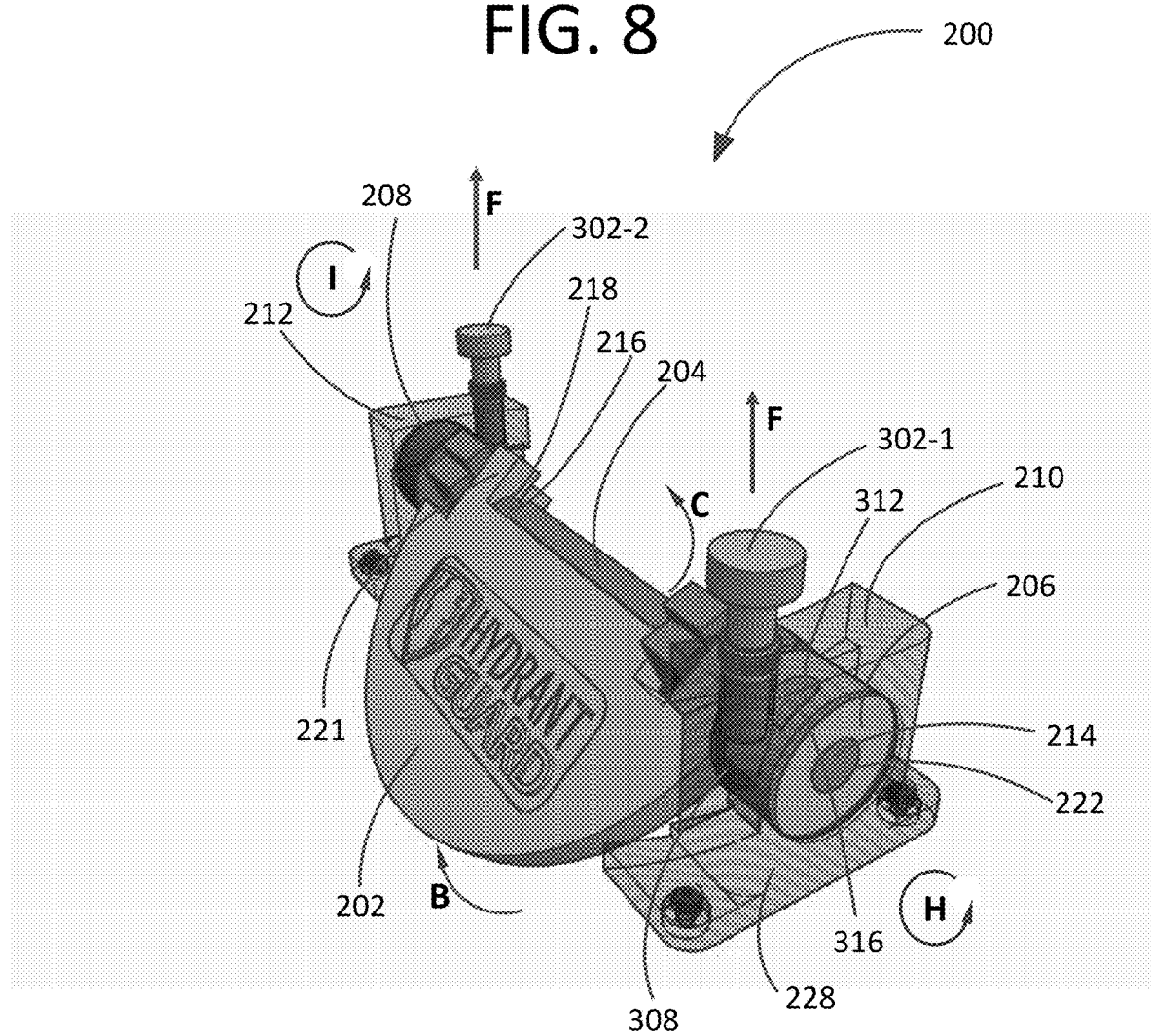
Figure 9:
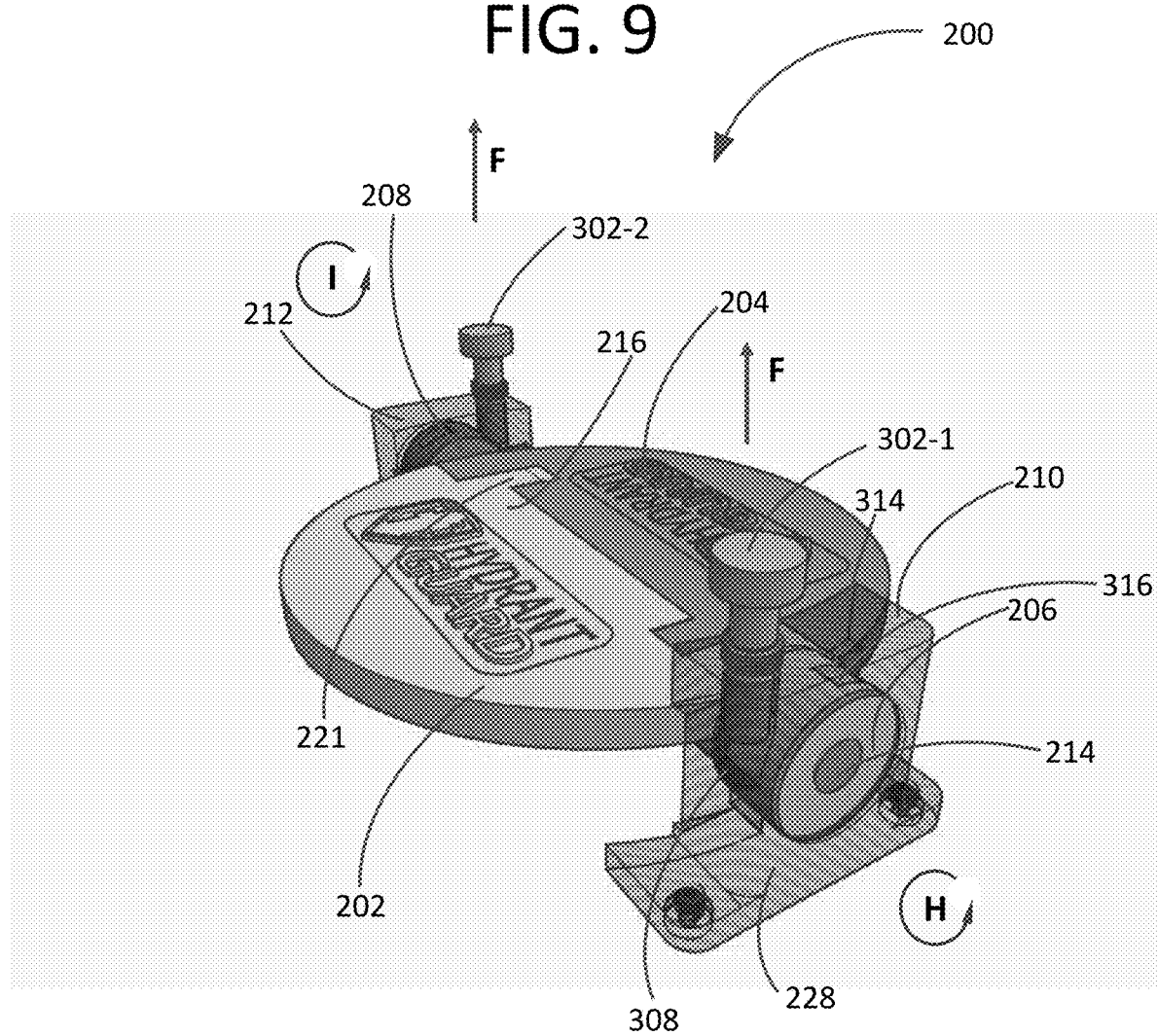

As shown in the FIGS. 7-9, the valve assembly 200 may be configured with the front alignment pin 214 passing through the front pin hole 218 of the front valve plate's front valve hub 206, and through the second back alignment hole 224 in the second back section 223 of the back valve plate 204. In this way, the front valve plate 202 and the back valve plate 204 may be secured together with each plate 202, 204 rotatable about the longitudinal axis of the front alignment pin 214. In addition, the back alignment pin 216 may pass through the back pin hole 218 of the back valve plate's back valve hub 208, and through the second front alignment hole 222 in the second front section 221 of the front valve plate 202. In this way, the back valve plate 204 and the front valve plate 202 may be secured together with each plate 202, 204 rotatable about the longitudinal axis of the back alignment pin 216.

In one exemplary embodiment hereof, the front valve hub 206 may be integrated with the front valve plate 202 during the manufacturing process. For example, the front valve hub 206 and the front valve plate 202 may be cast together as a single cast. In another example, the front valve hub 206 and the front valve plate 202 may be welded together, bolted together, screwed together or attached together using other attachment mechanism or methods, and any combination thereof. Similarly, the back valve hub 208 may be integrated with the back valve plate 204 during the manufacturing process. For example, the back valve hub 208 and the back valve plate 204 may be cast together as a single cast. In another example, the back valve hub 208 and the front valve plate 204 may be welded together, bolted together, screwed together or attached together using other attachment mechanism or methods, and any combination thereof. This may provide additional strength to the valve plate 202, 204 valve hub 206, 208 combinations respectively.

In addition, producing the valve plates 202, 204 and the valve hubs 206, 208 as solid and/or single units respectively may also eliminate the need for offset hinges and/or additional support elements across the center region of the opening 104 (see FIG. 4) as may be required by other valve plates that may be attached in other openings by use of valve pins.

Figure 12:
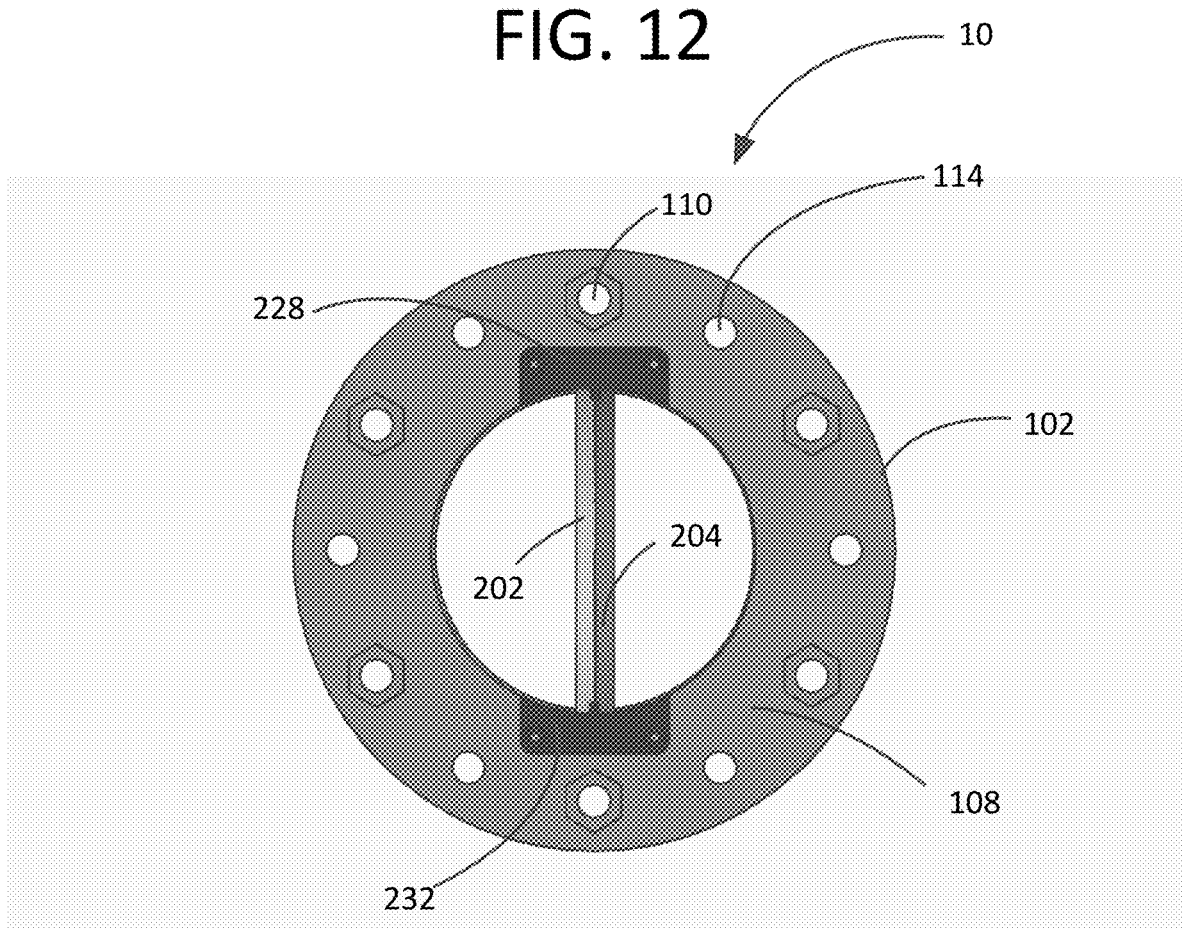
Figure 13:
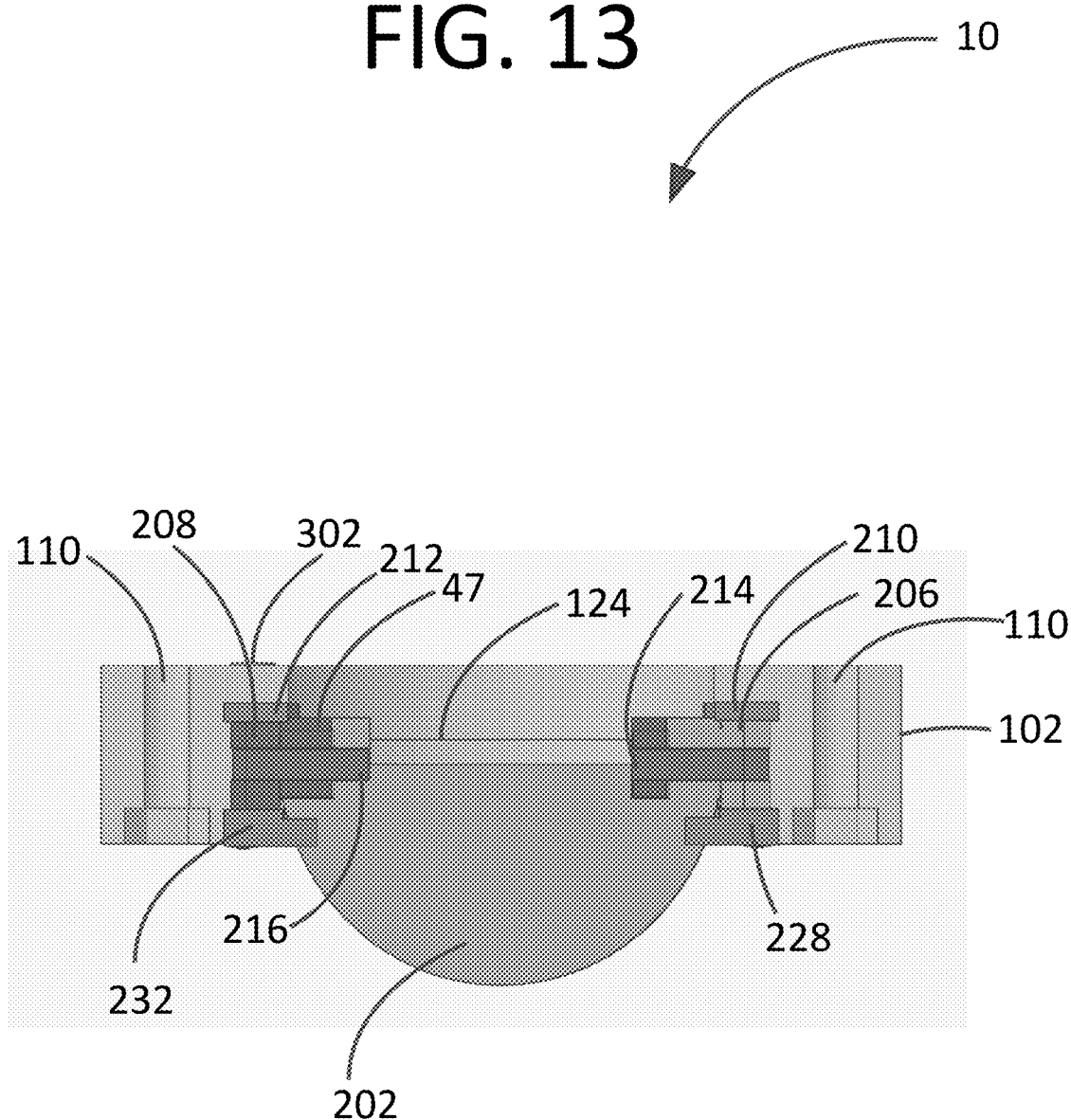
Figure 14:
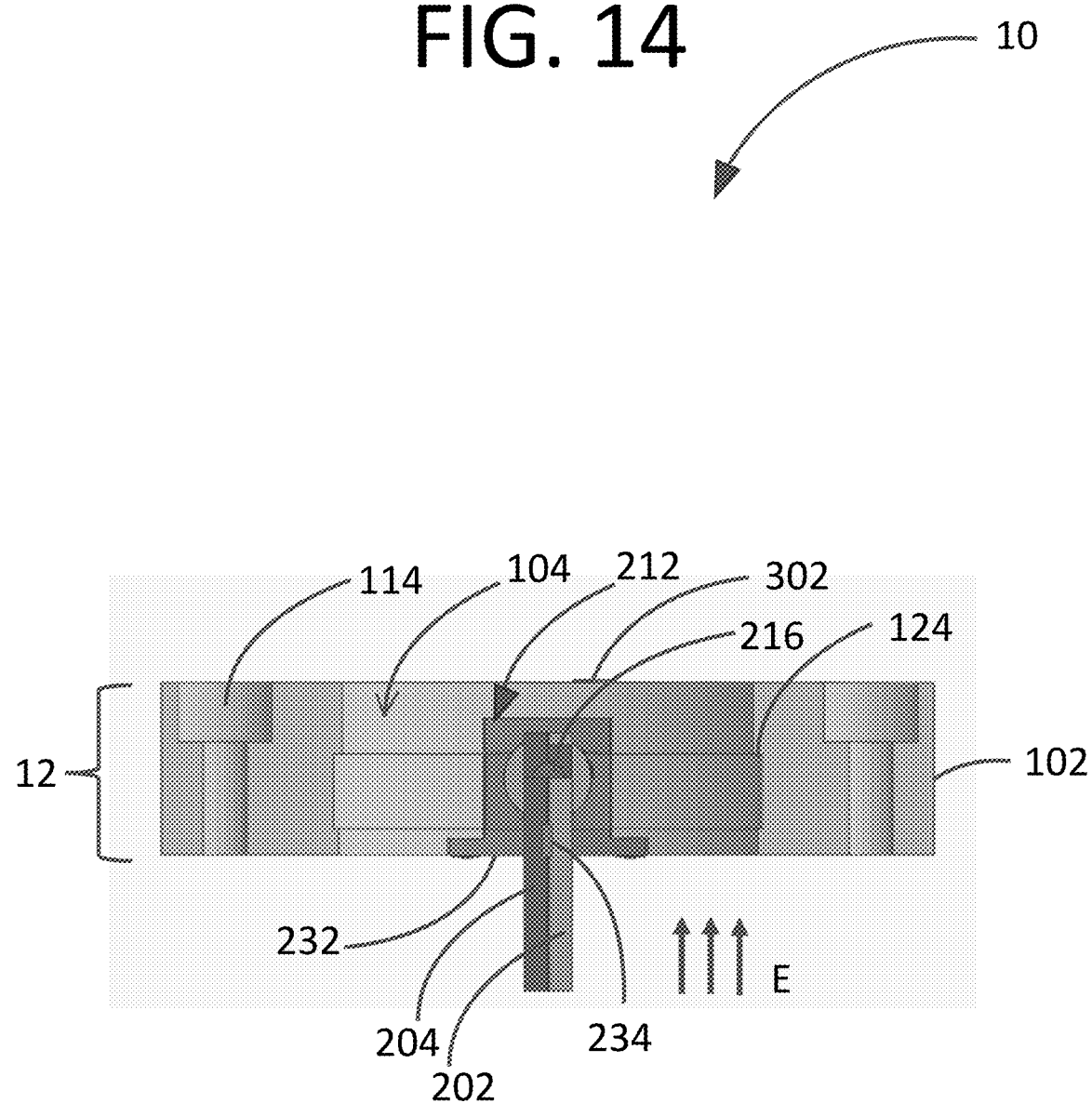

Furthermore, producing the valve plates 202, 204 and the valve hubs 206, 208 together respectively in this way may enable the valve plates to abut against one another when in the fully downward and open positions (as shown in FIG. 12). By minimizing and streamlining the cross-sectional footprint of the two valve plates 202, 204 together, this configuration may maximize the water flow rate through the opening 104. This configuration may also increase stability and decrease potential vibrations that may occur when the hydrant 14 may be in use.

Next, the front valve holder 210 may include a front holder opening 226 and a front valve holder base 228. The front holder opening 226 may be configured to receive and generally secure the front valve hub 206. It may be preferable that the front holder opening 226 have a cross-section that may be circular so that the front valve hub 206 (which may also preferably have a circular cross-section that corresponds to the cross-section of the front holder opening 226) may fit within the opening 226 and freely rotate therein (along the longitudinal axis of the alignment pin 214 as described). In this way, the front valve hub 206 and the front alignment pin 214 may be secured within the opening 226 of front valve holder 210.

The front valve holder 210 may be received by and secured within a valve holder recess 120 on an inner surface of the opening 104 (See FIG. 4) of the barrel 102 (FIG. 3). As will be described in other sections, the front valve holder base 228 may include attachment mechanisms (e.g., bolts, nuts, screws) that may be used to secure the front valve holder 210 within the valve holder area 120 (e.g., within the valve holder area's recess).

Likewise, the back valve holder 212 (See FIG. 6) may include a back holder opening 230 (See FIG. 6) and a back valve holder base 232. The back holder opening 230 may be configured to receive and generally secure the back valve hub 208 (See FIG. 7). It may be preferable that the back holder opening 230 have a cross-section that may be circular so that the back valve hub 208 (which may also preferably have a circular cross-section that corresponds to the cross-section of the back holder opening 230) may fit within the opening 230 and freely rotate therein (along the longitudinal axis of the alignment pin 216 (See FIG. 6) as described). In this way, the back valve hub 208 and the back alignment pin 216 may be secured within the opening 230 of the back valve holder 212.

The back valve holder 212 may be received by and secured within a valve holder area 120 on an inner surface of the opening 104 of the barrel 102 (FIG. 3). As will be described in other sections, the back valve holder base 232 (See FIG. 6) may include attachment mechanisms (e.g., bolts, nuts, screws) that may be used to secure the back valve holder 212 within the valve holder area 120 (e.g., within the valve holder area's recess).

The result of the above configuration is shown in FIGS. 6-9. FIG. 7 shows the valve assembly 200 in the open configuration with the front and back valve plates 202, 204 rotated downward. FIG. 8 shows the valve assembly 200 in a partially closed configuration with the front valve plates 202 rotated upward in the direction of the arrow B and the back valve plate 204 partially rotated upward in the direction of the arrow C. And as the front valve plate 202 may continue to rotate upward in the direction of the arrow B to its stop position, and as the back valve plate 204 may continue to rotate upward in the direction of the arrow C to its stop position, the valve assembly 200 may transition to the closed configuration as shown in FIG. 9.

It may be preferable that when the front and back valve plates 202, 204 are both in their upward and closed configuration (FIG. 9), that the junction between the plates 202, 204 may be water tight and free of leaks. In this way, no water may pass through the junction between the valve plates 202, 204 when the valve 200 may be closed.

Housing Assembly and Valve Assembly Configured Together

In one exemplary embodiment hereof as shown in FIGS. 10-18, the valve assembly 200 may be configured within the central opening 104 of the housing assembly 100. In one preferred implementation, the opening 104 may include two valve holder areas 120-1 and 120-2 as best seen in FIG. 5. In this implementation, the front valve holder 210 may be received by and secured into the valve holder recesses 120-1, and the back valve holder 212 may be received by and secured into the valve holder area 120-2 (or vice versa).

It may be preferable that the valve holder recess 120-1, 120-2 may each include a recess, channel or other type of area that may receive the valve holders 210, 212 respectively such that the valve holders 210, 212 may be fully incorporated within the valve holder areas 120-1, 120-2 (e.g., may be flush with the inner surface of the opening 104). In this configuration, the valve holders 210, 212, when configured within the valve holder areas 120-1, 120-2 respectively, may not interfere with the functionalities of the valve assembly 200 when the valve assembly 200 may be configured within the opening 104. As shown, the front valve holder base 228 and the back valve holder base 232 may each include attachment mechanisms (e.g., bolts, nuts, screws) that may secure the valve holders 210, 212, within the valve holder areas 120-1, 120-2 respectively. In this way, the valve assembly 200 may be securely attached within the opening 104 of the barrel 102, and the front valve plate 202 and the back valve plate 204 may each rotate freely as required to fulfill the functionality of the valve assembly 200.

Figure 11:
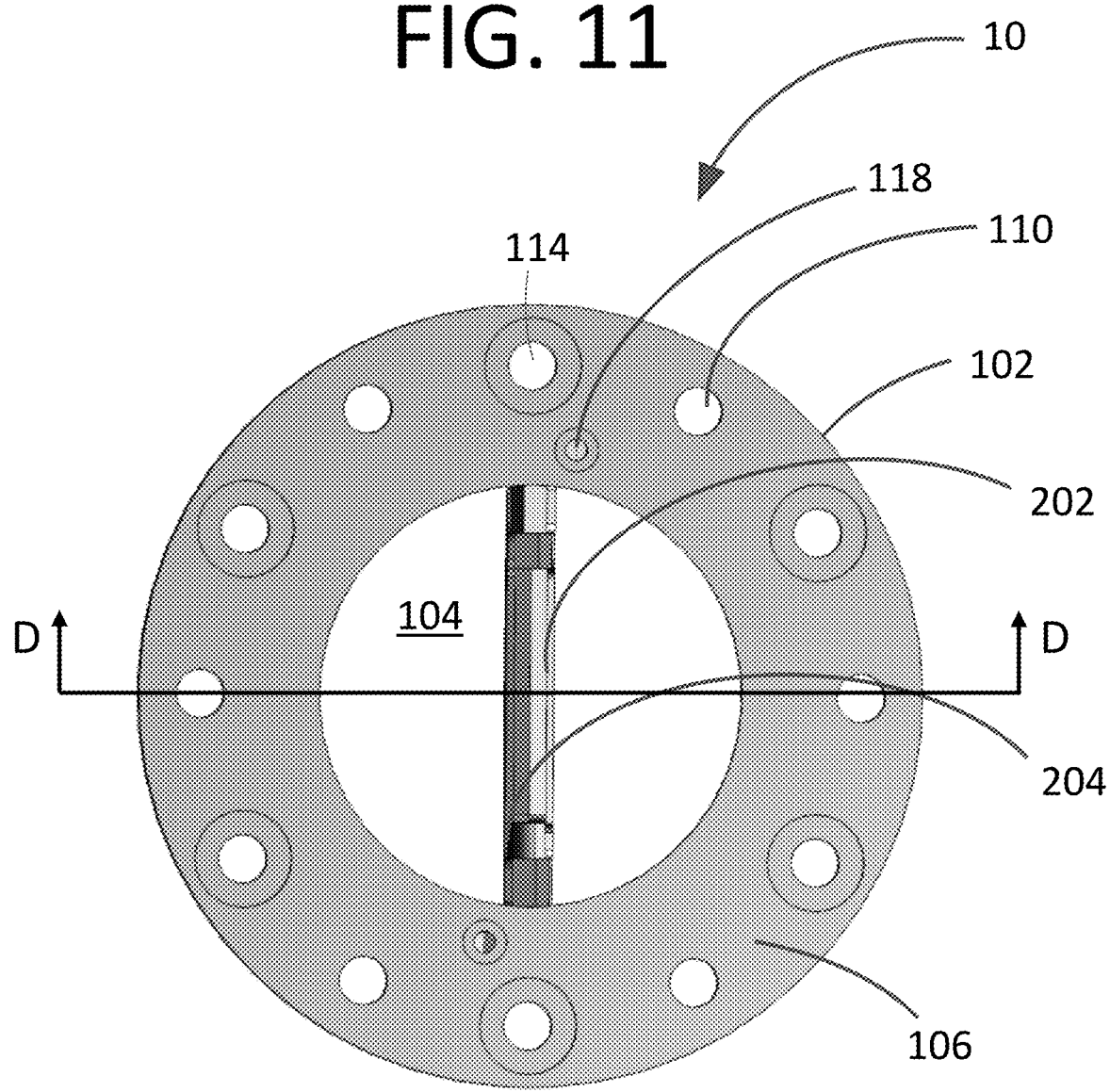
Figure 15:
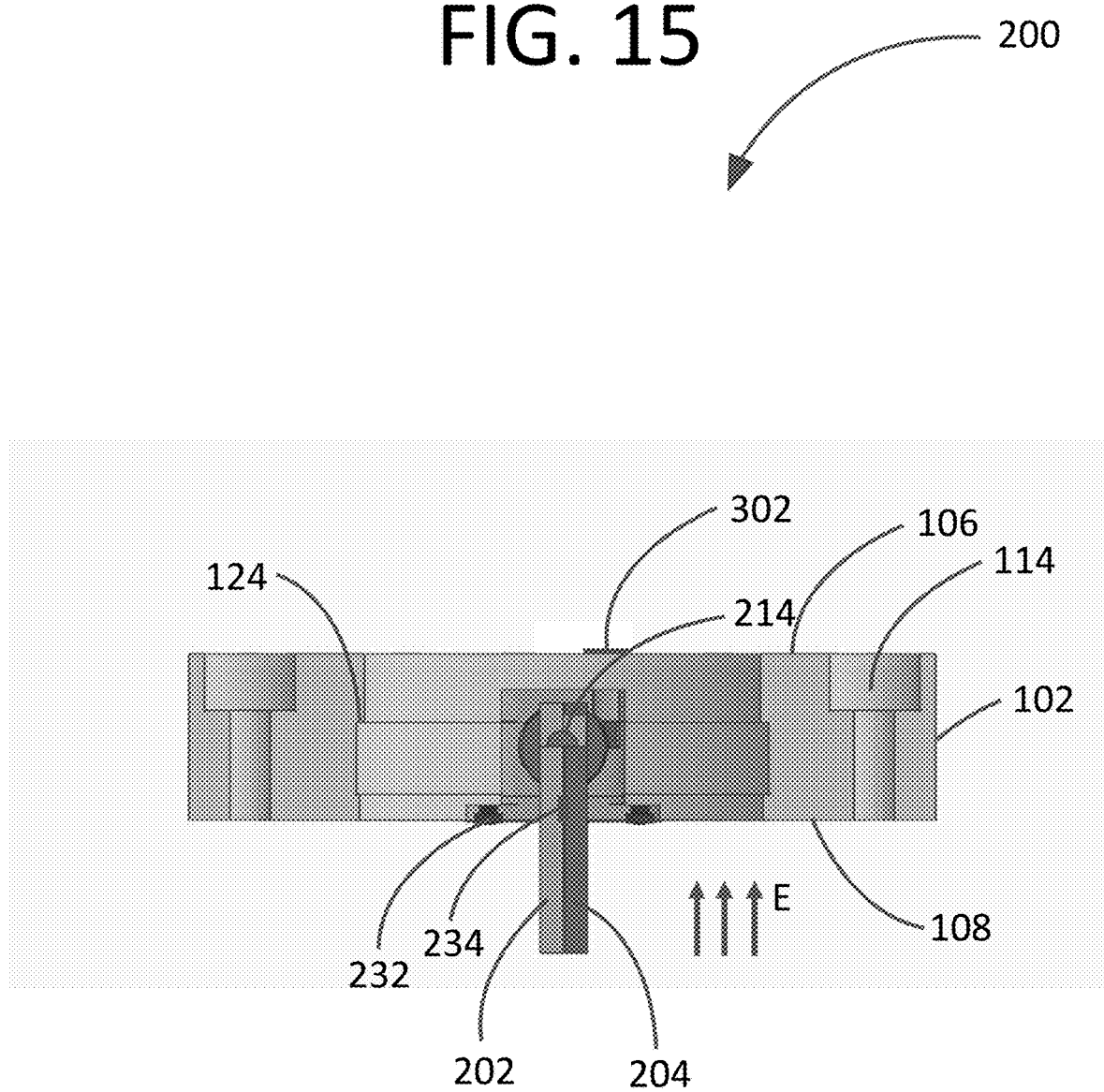

FIG. 15 shows a cutaway view of the barrel 102 along the cut lines D-D of FIG. 11. As shown, the valve assembly 200 may be configured within the opening 104 of the barrel 102 in its fully open configuration with the front valve plate 202 and the back valve plate 204 each rotated fully downward. In this configuration, the water from the water main 12 may flow upward through the valve assembly 200 and the opening 104 as shown by the arrows E.

Figure 16:
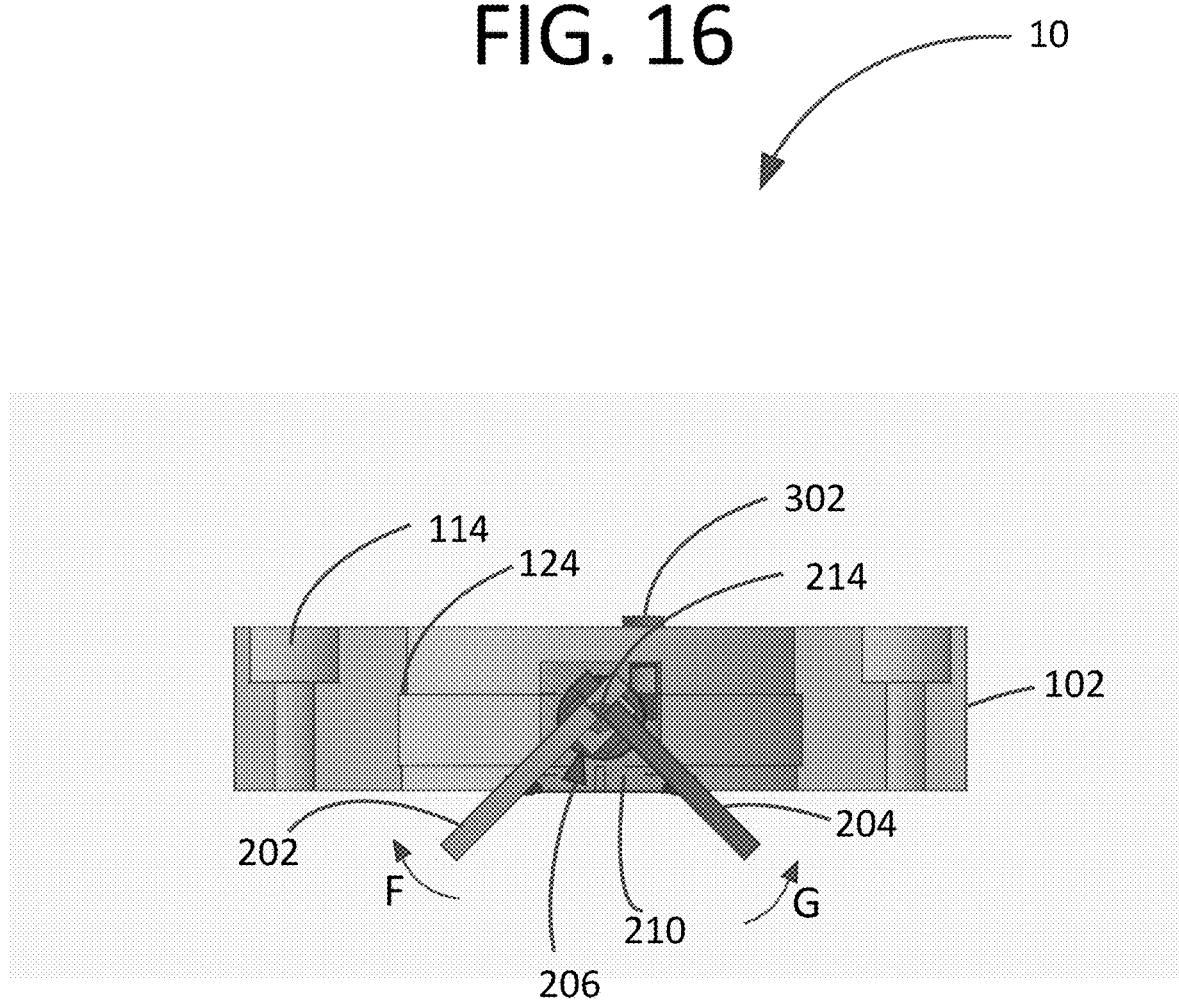

FIG. 16 shows a similar cutaway view of the barrel 102, but with the valve assembly 200 in a partially closed configuration with the front valve plate 202 and the back valve plate 204 partially rotated upward in the direction of the arrows F and G respectively.

Figure 17:
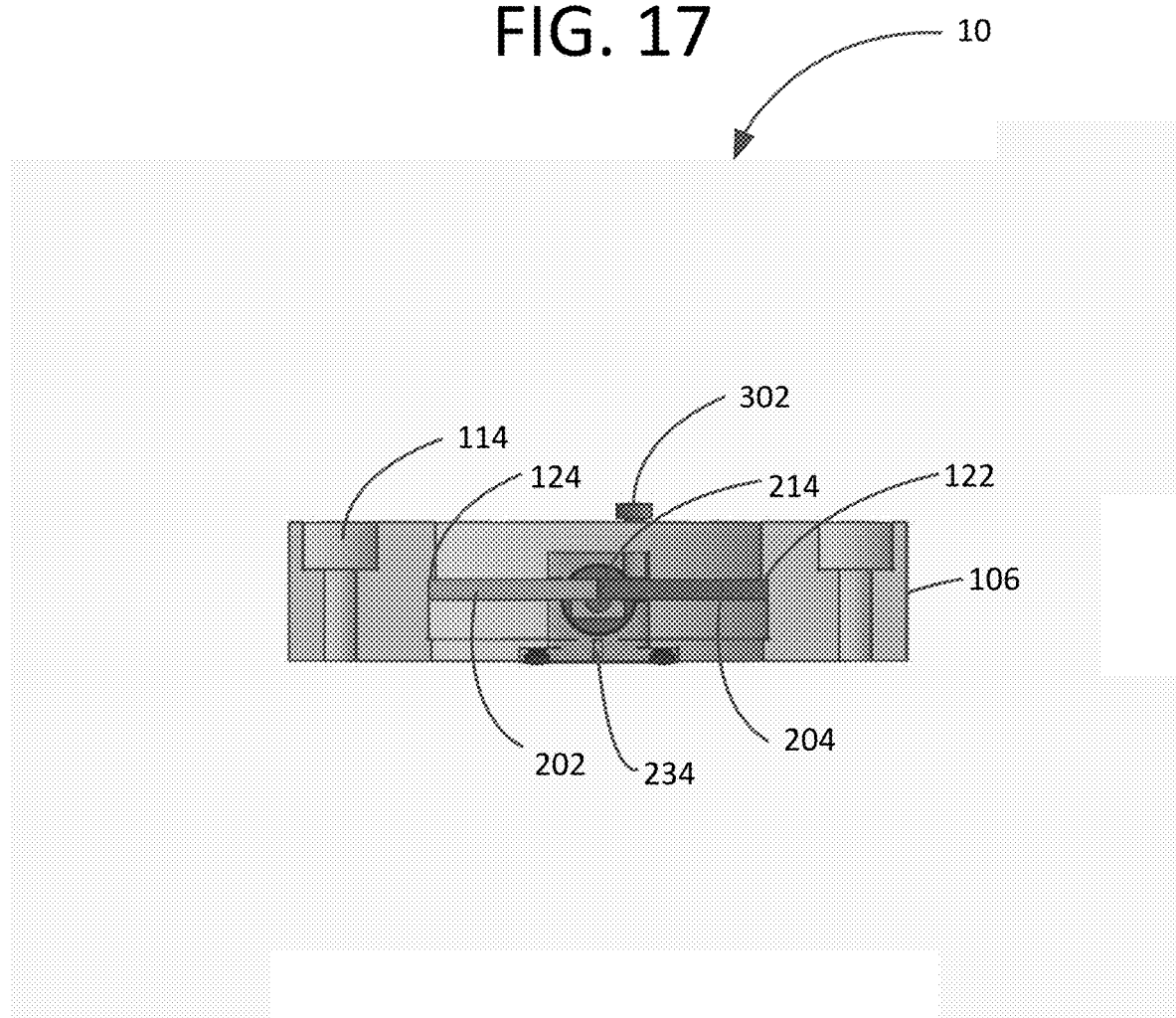
Figure 18:
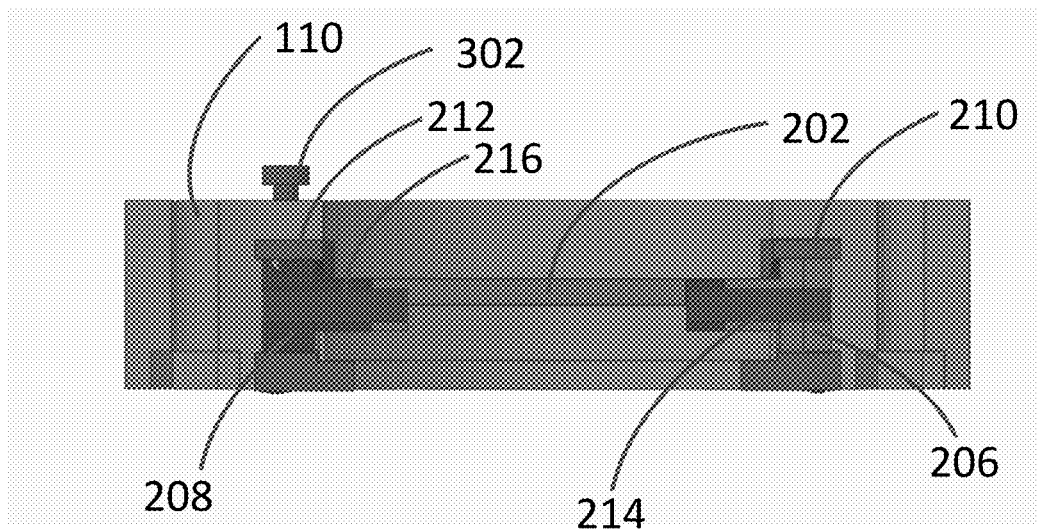

FIG. 17 shows a similar cutaway view of the barrel 102, but with the valve assembly 200 in a fully closed configuration with the front valve plate 202 and the back valve plate 204 fully rotated approximately ninety degrees into their fully closed positions and away from the valve holder stabilizer tabs 234. In this configuration, it can be seen that the outer top edges of the front valve plate 202 and the back valve plate 204 may abut against the downward facing surface 124 of the valve sealing surface 122. In this way, the valve sealing surface 122 may provide a sealed junction between the valve plates 202, 204 and the inner surface of the opening 104 when the valve plates 202, 204 may be in the fully closed configuration. It may be preferable that when in this configuration, the valve assembly 200 may prohibit the flow of water from the water main 12 through the valve assembly 200 and opening 104. It may also be preferable that the seal between the valve plates 202, 204 and the valve sealing surface 122 be free of leaks, and that the valve assembly 200 be constructed to withstand the water pressure presented by the water main 12. A gasket or other type of sealant may or may not be configured between the valve plates 202, 204 and downward facing surface 124 as required.

Actuation Assembly

In one exemplary embodiment hereof, the system 10 may include an actuation assembly 300. The actuation assembly 300 may cause (or enable) the valve assembly 200 to transition from a fully open configuration to a fully closed configuration when triggered. In one exemplary embodiment hereof, the actuation assembly 300 may include one or more keeper pins 302-1, 302-2, . . . 302-n (individually and collectively 302) that may be configured with the front valve holder 210 and the front valve hub 206 and/or the back valve holder 212 and the back valve hub 208.

Returning to FIG. 6, each keeper pin 302 may include a pin shaft 304, a pin head 306, a pin shaft bottom 308 and side threads 310.

Also, the front valve holder 210 may include a keeper pin opening 311 that may receive and secure the keeper pin 302-1, and the back valve holder 212 may include a keeper pin opening 313 that may receive and secure the keeper pin 302-2. In addition, the front valve hub 206 may include a keeper pin area 312 that may include a keeper pin slot 314 with a keeper pin slot lower surface 316, and the back valve hub 208 may include a keeper pin area 318 that may include a keeper pin slot 320 with a keeper pin slot lower surface 322.

As shown in FIG. 7, with the front valve plate 202 in its lower and open configuration, the keeper pin area 312 may receive the keeper pin 302-1 into its keeper pin slot 314 such that the bottom 308 of the keeper pin 302-1 may engage with and generally abut against the keeper pin slot lower surface 316. In this way, with the keeper pin 302-1 held secure in this position within the keeper pin opening 311 in the valve holder 210 (and within a keeper pin flange hole 118 within the housing assembly 100 as will be describe in other sections), the keeper pin 302-1 may disallow the front valve hub 206 (and its associated front valve plate 202) from rotating upward. That is, the keeper pin 302-1, when secure in this position and with its bottom 308 abutted against its associated keeper pin slot lower surface 316, may disallow the front valve plate 202 from leaving its open configuration, and the front valve plate 202 may be essentially locked in its downward and open position.

Similarly, with the back valve plate 204 in its lower and open configuration, the keeper pin area 318 may receive the keeper pin 302-2 into its keeper pin slot 320 such that the bottom 308 of the keeper pin 302-2 may engage with and generally abut against the keeper pin slot lower surface 322. In this way, with the keeper pin 302-2 held secure in this position within the keeper pin opening 313 in the valve holder 212 (and within a keeper pin flange hole 118 in the housing assembly 100 as will be describe in other sections), the keeper pin 302-2 may disallow the back valve hub 208 (and its associated front valve plate 204) from rotating upward. That is, the keeper pin 302-2, when secure in this position and with its bottom 308 abutted against its associated keeper pin slot lower surface 316, may disallow the back valve plate 204 from leaving its open configuration, and the back valve plate 204 may be essentially locked in its downward and open position.

Then, in one exemplary embodiment hereof as shown in FIG. 8, when the keeper pin 302-1 may be released and able to move upward in the direction of the arrows F within the keeper pin opening 311, the bottom 308 of the keeper pin 302-1 may no longer abut against the keeper pin slot lower surface 316. In this way, the front valve hub 206 may no longer be locked in its position and may be free to rotate in the direction of the arrow H. Likewise, the front valve plate 202 may also be no longer locked in its lower and open position, and may be free to rotate upward in the direction of the arrow B.

Similarly, when the keeper pin 302-2 may be released and able to move upward in the direction of the arrows F within the keeper pin opening 313, the bottom 308 of the keeper pin 302-2 may no longer abut against the keeper pin slot lower surface 322. In this way, the back valve hub 208 may no longer be locked in its position and may be free to rotate in the direction of the arrow H. Likewise, the back valve plate 204 may also be no longer locked in its lower and open position, and may be free to rotate upward in the direction of the arrow C.

Note that it can be seen in FIG. 8 that with the keeper pins 302-1 and 302-2 lifted upward in the direction of the arrows F, and with the front and back valve hubs 206, 208 rotated in the direction of the arrows H and I respectively, and with the front and back valve plates 202, 204 rotated upward in the direction of the arrows B and C respectively, that the front keeper pin area 312, the front keeper pin slot 314 and the front keeper pin slot lower surface 316 may be disengaged from the keeper pin 302-1 and may be rotated in the direction of the arrow H away from the keeper pin 302-1.

Then, as shown in FIG. 9, with the keeper pins 302-1, 302-2 disengaged from the keeper pin areas 312, 318 respectively, the front and back valve plates 202, 204 may continue to rotate in the directions of the arrows B and C respectively, until the valve plates 202, 204 may be configured in their fully upward and closed position. In this position, the valve assembly 200 may disallow any water from passing through the valve assembly 200 and the opening 104 within the barrel 102.

Note that in this configuration, the keeper pins may interface with the valve hubs 206, 208 and with the valve plates at their hinge point, and outside the path of flow through the opening 104. This may result in a much more compact and streamlined design.

The triggering and disengaging of the keeper pins 302 so that they may move upward in the direction of the arrows F in FIG. 8 will now be described in further detail.

As shown in FIG. 1, in one exemplary embodiment hereof, the system 10 may be configured between two passageways (e.g., a water main 12 and a fire hydrant 14). In this way, the bottom surface of the barrel 102 may be generally abutted against the top surface of the water main 12, and the top surface of the barrel 102 may be generally abutted against the bottom surface of the fire hydrant 14.

Figure 19:
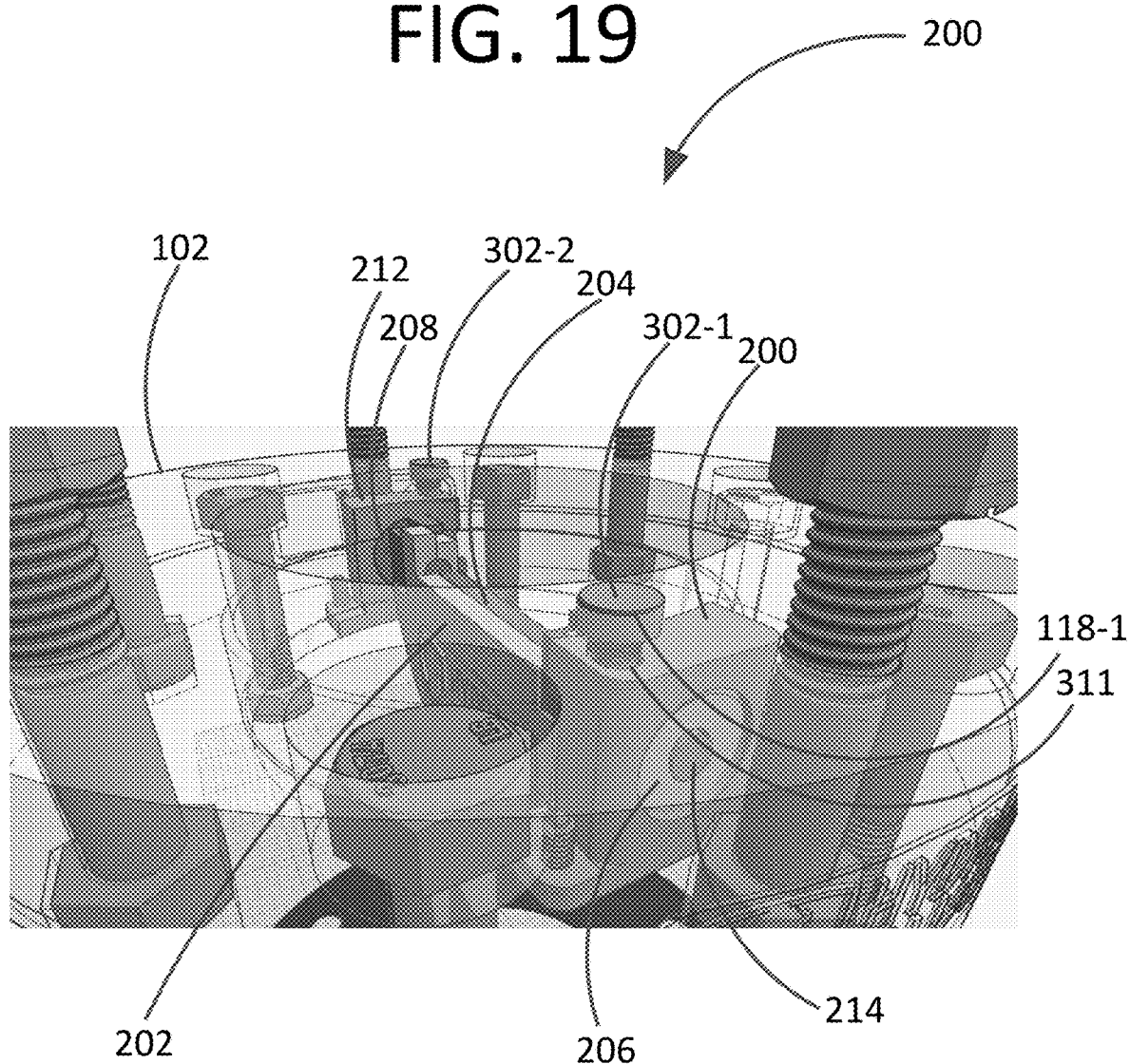
FIGS. 19-22 show aspects of an activation assembly according to exemplary embodiments herein.

Moving now to FIG. 4, in one exemplary embodiment hereof, the top surface of the barrel 102 may include a first barrel pin opening 118-1 and a second barrel pin opening 118-2. Then, as shown in FIG. 19, with the valve assembly 200 configured within the inner opening 104 of the barrel 102, the first barrel pin opening 118-1 may pass through the upper portion of the barrel 102 and intersect in alignment with the keeper pin opening 311 in the top of the valve holder 210. In this way, the keeper pin 302-1 may be received into the first barrel pin opening 118-1 and the keeper pin opening 311 simultaneously.

Similarly, the second barrel pin opening 118-2 may pass through the upper portion of the barrel 102 and intersect in alignment with the keeper pin opening 313 in the top of the valve holder 212. In this way, the keeper pin 302-2 may be received into the second barrel pin opening 118-2 and the keeper pin opening 313 simultaneously.

Figure 20:
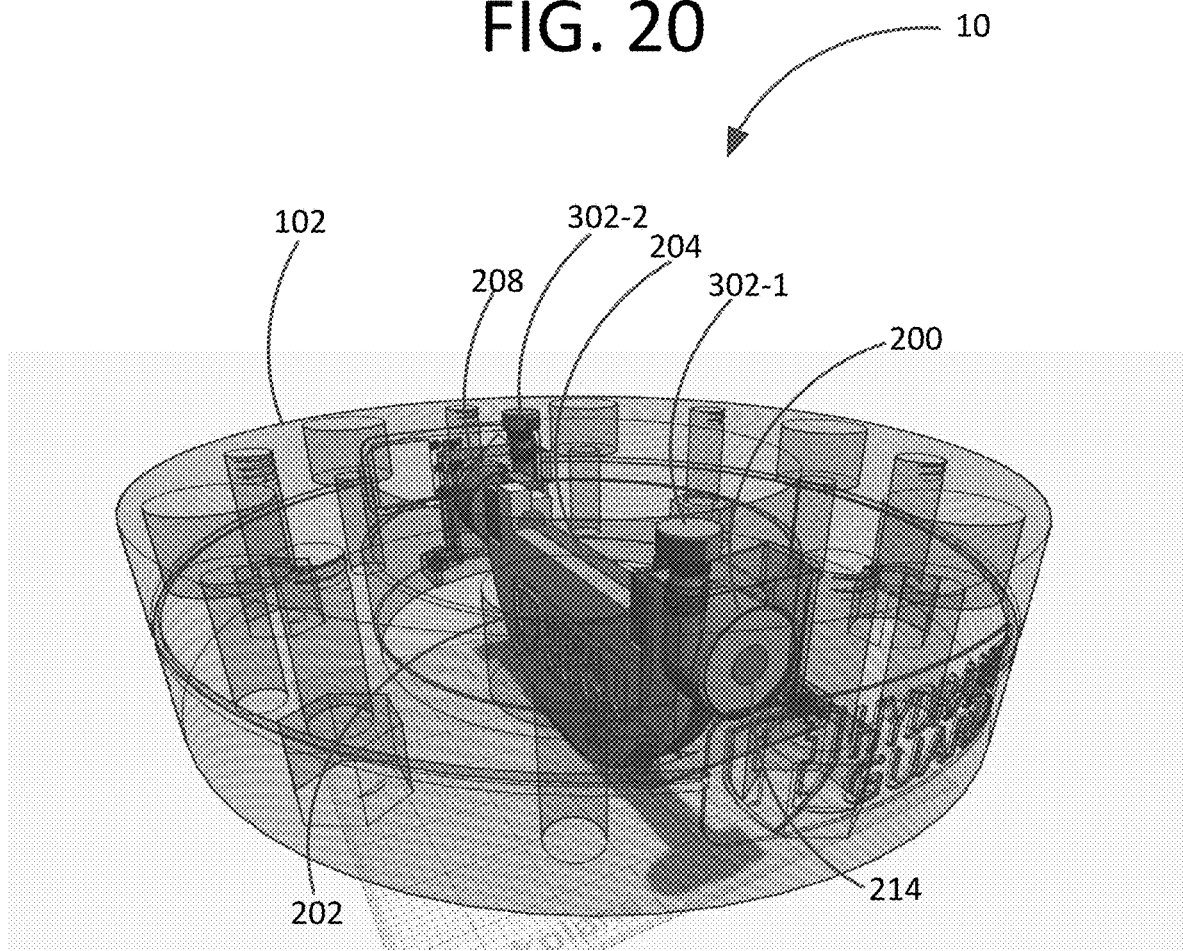

As shown in FIGS. 19 and 20, in one exemplary embodiment hereof, the length of the keeper pins 302 may be chosen such that when the keeper pins 302 may be configured within the barrel pin openings 118-1, 118-2 and the keeper pin openings 311, 313 respectively, that the top surfaces of the heads 306 of the keeper pins 302 may each be generally flush with the top surface of the barrel 102 when the bottom 308 of the keeper pins 302 are engaged with and abutted against the keeper pin slot lower surfaces 316, 322 respectively. That is, when the top surfaces of the heads 306 of the keeper pins 302 are flush with the top surface of the barrel 102, the bottoms 308 of the keeper pins 302 may be abutted against the keeper pin slot lower surfaces 316, 322 respectively and the valve hubs 206, 208 may each be locked. Accordingly, the front valve plate 202 and the back valve plate 204 may both be locked in their downward and open positions when in this configuration.

Figure 27:
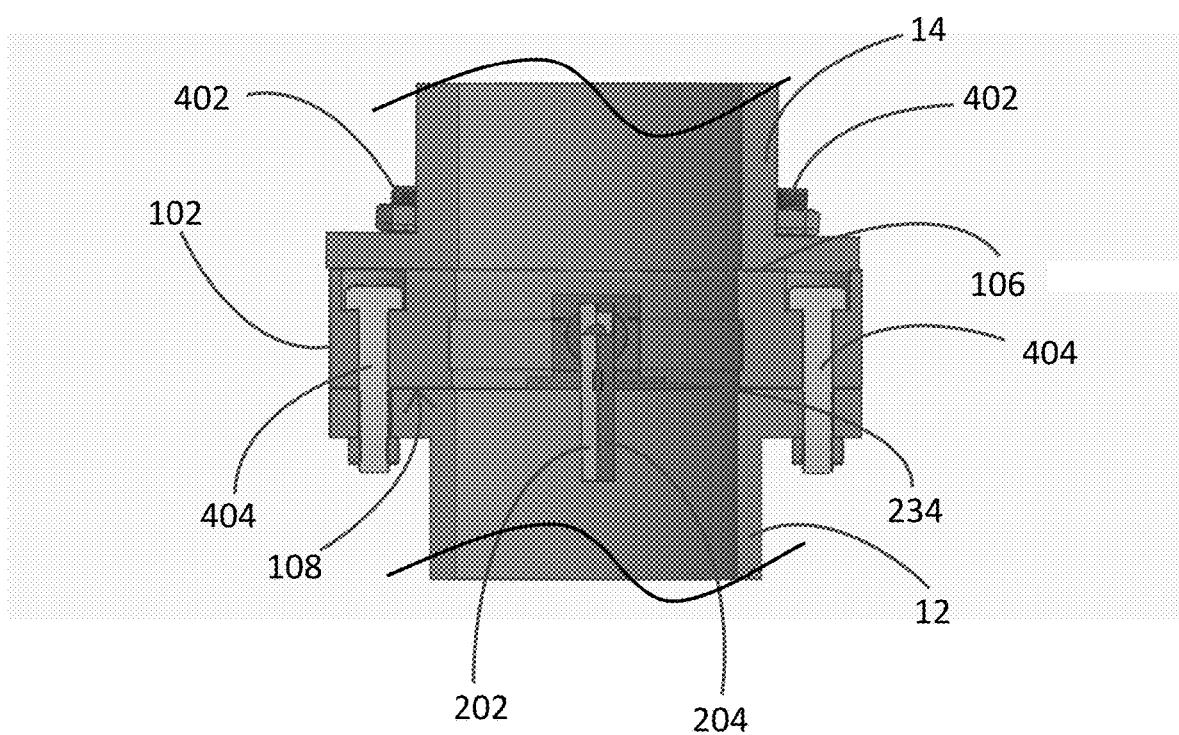
FIGS. 27-29 show aspects of a breakaway check valve according to exemplary embodiments herein.

As shown in FIG. 27, it can be seen that with the bottom of the fire hydrant 14 secured to and in contact with the top surface of the barrel 102 of the system 10, that the bottom surface of the hydrant 14 may provide a stop to the heads 306 of the keeper pins 302. That is, it may be preferable that with the hydrant 14 secured to the top of the barrel 102, that at least a portion of the bottom surface of the fire hydrant 14 may be abutted against at least a portion of the top of the heads 306 of the keeper pins 302 such that the tops of the keeper pins 302 may be held flush (or in a down position) with the top surface of the barrel 102. In this way, the keeper pins 302 may be secured in their downward positions and may thereby lock the valve hubs 206, 208 and the valve plates 202, 204 in their open positions as described above.

Figure 21:
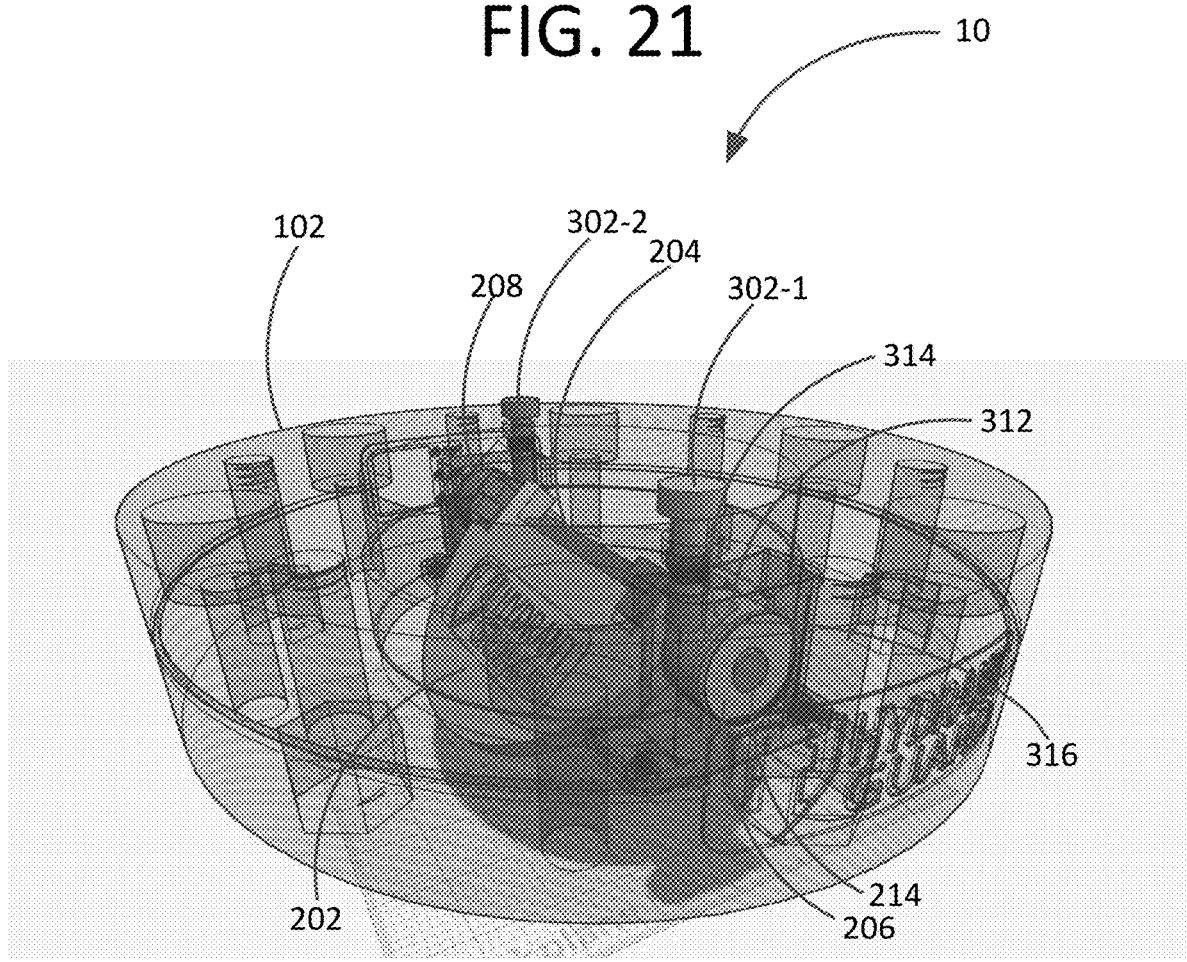
Figure 22:
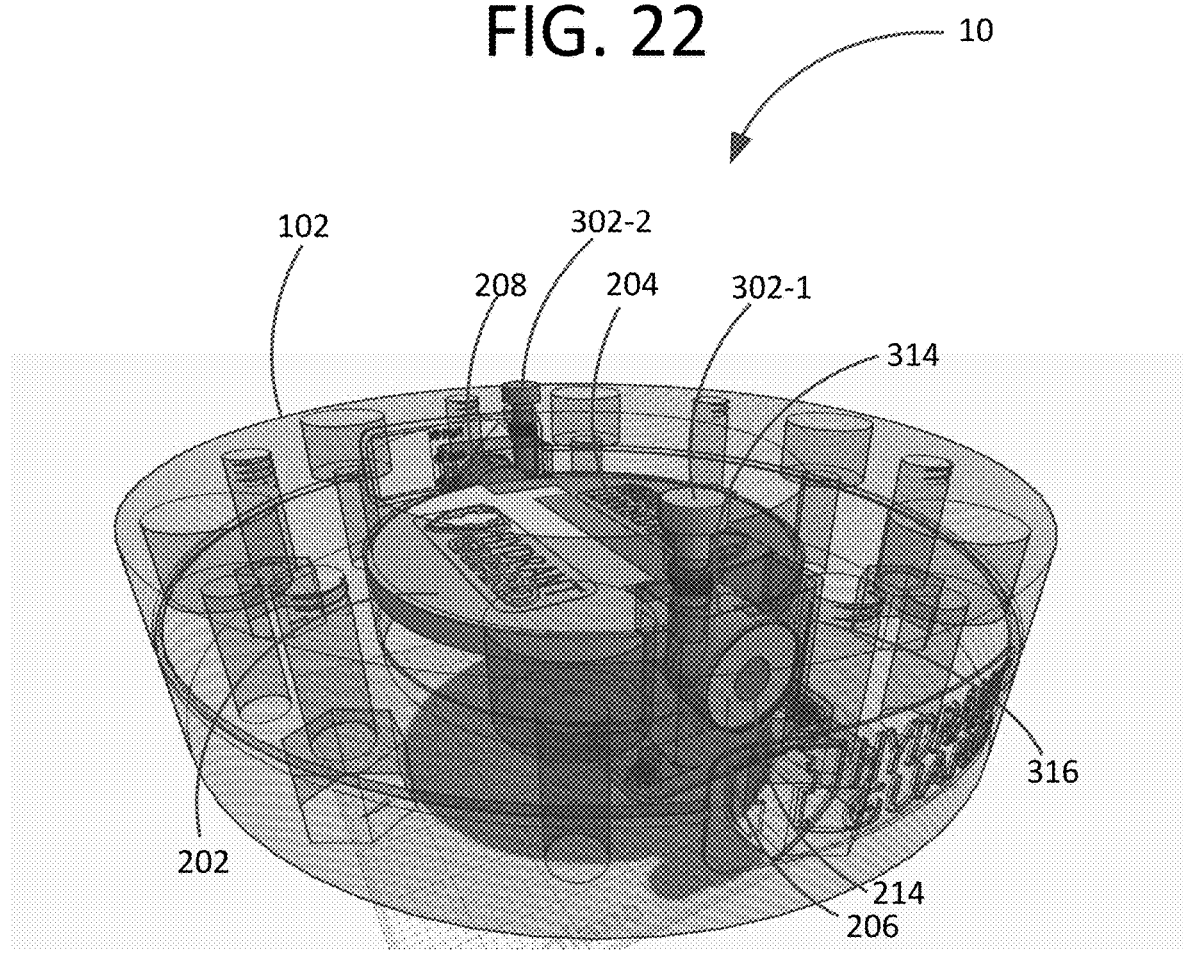
Figure 29:
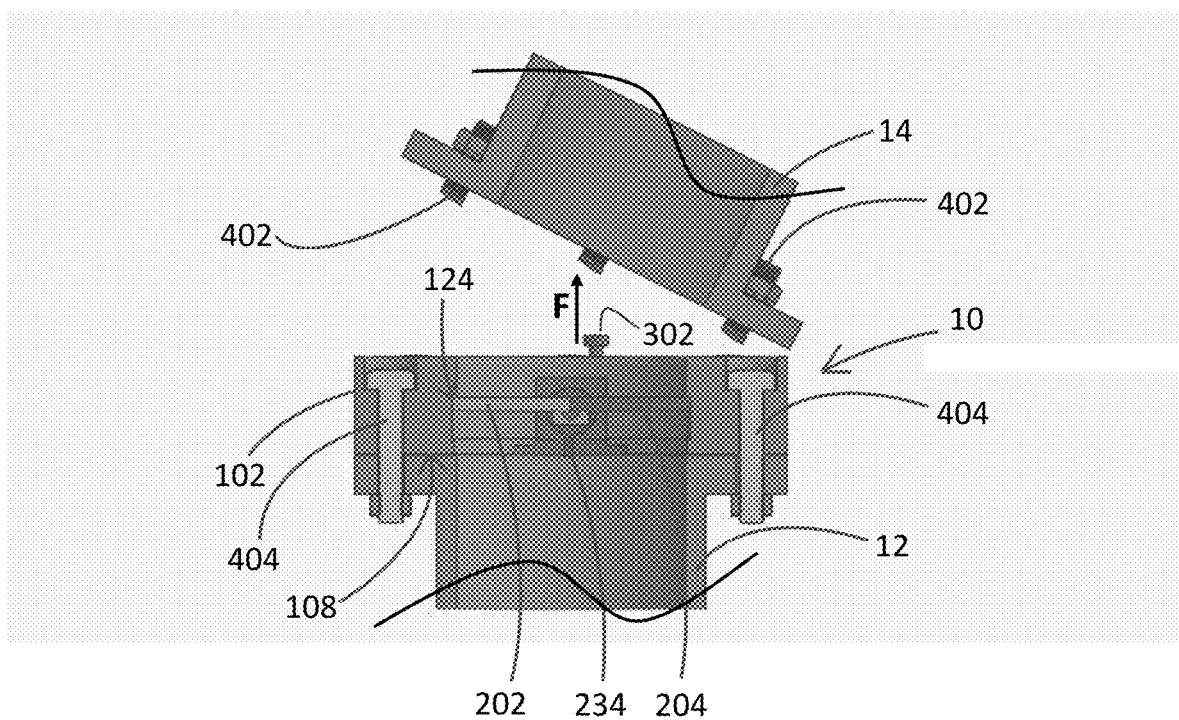

As seen in FIG. 29, it can also be seen that if the fire hydrant 14 may be removed (completely or partially) from the top surface of the barrel 102, that the bottom surface of the hydrant 14 may no longer abut against the tops of the keeper pins 302, and may no longer secure the keeper pins 302 in their downward positions. In this case, the keeper pins 302 may lift upward (and/or be free and generally unobstructed to be lifted or otherwise moved upward) in the direction of the arrows F such that the valve hubs 206, 208 may rotate (and/or be free to move) in the direction of the arrows H and I respectively (FIG. 8), and the valve plates 202, 204 may rotate upward (and/or be free to rotate upward) in the direction of the arrows F and G respectively, and into their upward and closed position. The valve plates 202, 204 may be lifted by the pressure of the water provided by the water main 12 which may in turn rotate the valve hubs 206, 208 and/or lift the keeper pins 302 upward. Alternatively, the keeper pins 302 and/or the valve hubs 206, 208 and/or the valve plates 202, 204 may be spring loaded. The results of this are shown in FIGS. 21 and 22.

Figure 23:
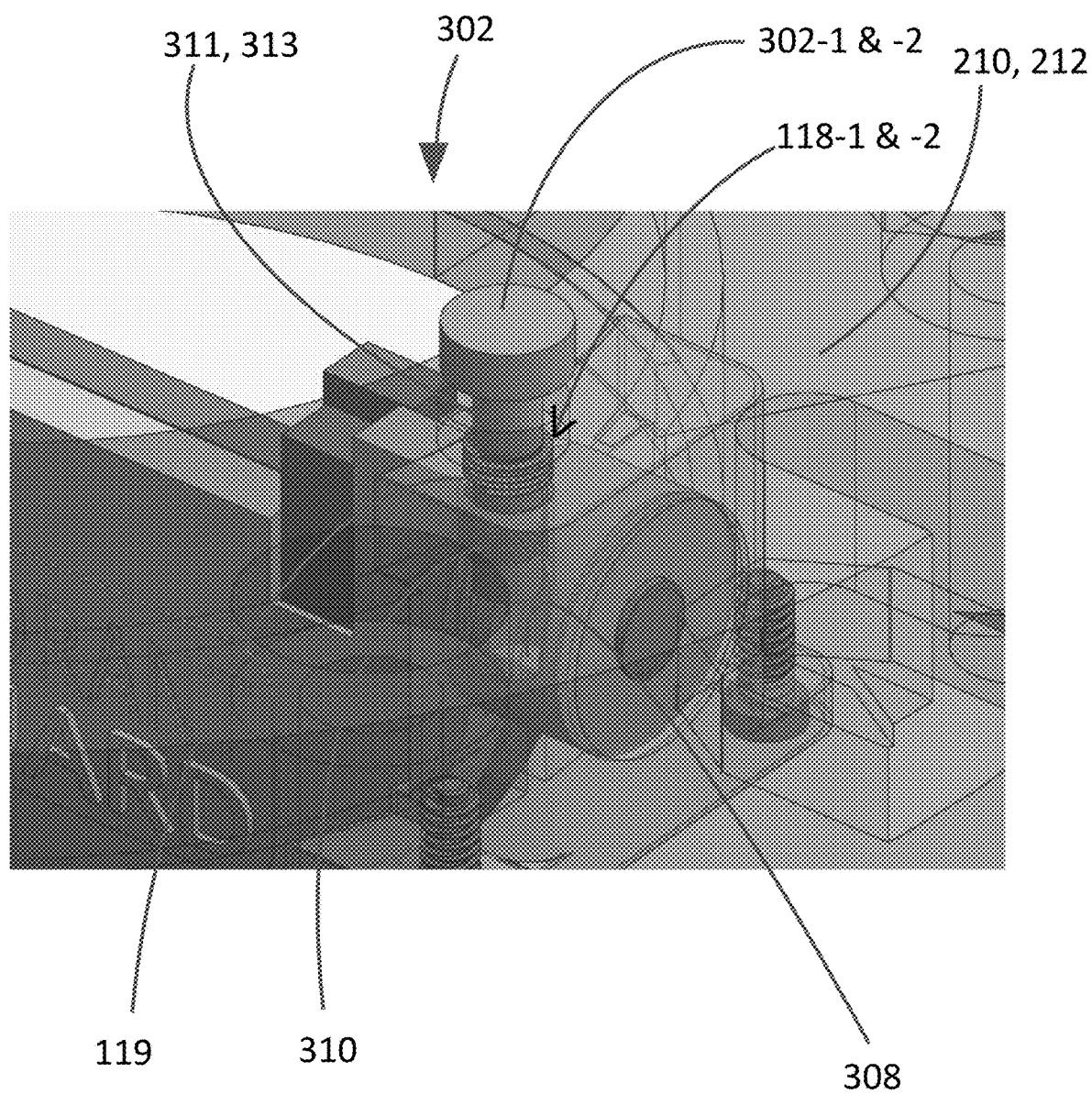
FIG. 23 shows aspects of keeper pin within a keeper pin opening according to exemplary embodiments herein.

In one exemplary embodiment hereof as shown in FIG. 23, the keeper pins 302 may include threads 310 along at least a portion of their shafts 304. As shown, it may be preferable for the threads 310 to be generally located in the middle portion of the shafts 304. In addition, the first and second barrel pin openings 118-1, 118-2 may each include corresponding threads 119 that may generally be positioned towards the top portions of the pin openings 118-1, 118-2 but not below along the middle or lower portions of the pin openings 118-1, 118-2. The keeper pins 302 may be screwed into the pin openings 118-1, 118-2 by engaging the threads 310 with the threads 119 and screwing the pins 302 downward. It can be seen that because the threads 119 may only be located in the upper portion of the pin openings 118-1, 118-2 that once the keeper pins 302 are screwed past the threads 119, that the keeper pins 302 may be free to move up and down in the non-threaded portions of the keeper pin openings 118-1, 118-2. In addition, it can also be seen that the threads 119 may act as a stop to the keeper pins 302 in the upward direction unless the keeper pins 302 are unscrewed from the threads 119. In this way, if and when the keeper pins 302 may be released by the bottom of the hydrant 14, the threads 119 may hold the keeper pins 302 within the keeper pin openings 118-1, 118-2 so that they may not become completely dislocated and potentially lost.

Note that while the above description described an activation assembly 300 that may include keeper pins 302 generally positioned on the upper portion of the system 10 (e.g., the barrel 102) such that the keeper pins 302 may activate the valve assembly 200 when released, it is understood that the system 10 may also and/or instead of, include keeper pins 302 positions on its lower portion so that the keeper pins 302 may activate the valve assembly 200 as describe but when the system 10 may become dislodged from the lower passageway 12 (e.g., the water main). It is understood that the descriptions above regarding the activation assembly 300 with the keeper pins 302 on the top portion of the barrel 102 may also apply to any keeper pins 302 that may be positioned on the bottom portion of the barrel 102 for these purposes. It is also understood that the scope of the system 10 is not limited in any way by the location of the keeper pins 302.

Attachment Assembly

In one exemplary embodiment hereof the system 10 may include an attachment assembly 400. The attachment assembly 400 may attach a first side of the system 10 to a first passageway and a second side of the system 10 to a second passageway. For example, as shown in FIG. 1, the first side of the system 10 may be attached to a water main 12 and the second side of the system 10 may be attached to a fire hydrant 14.

Figure 24:
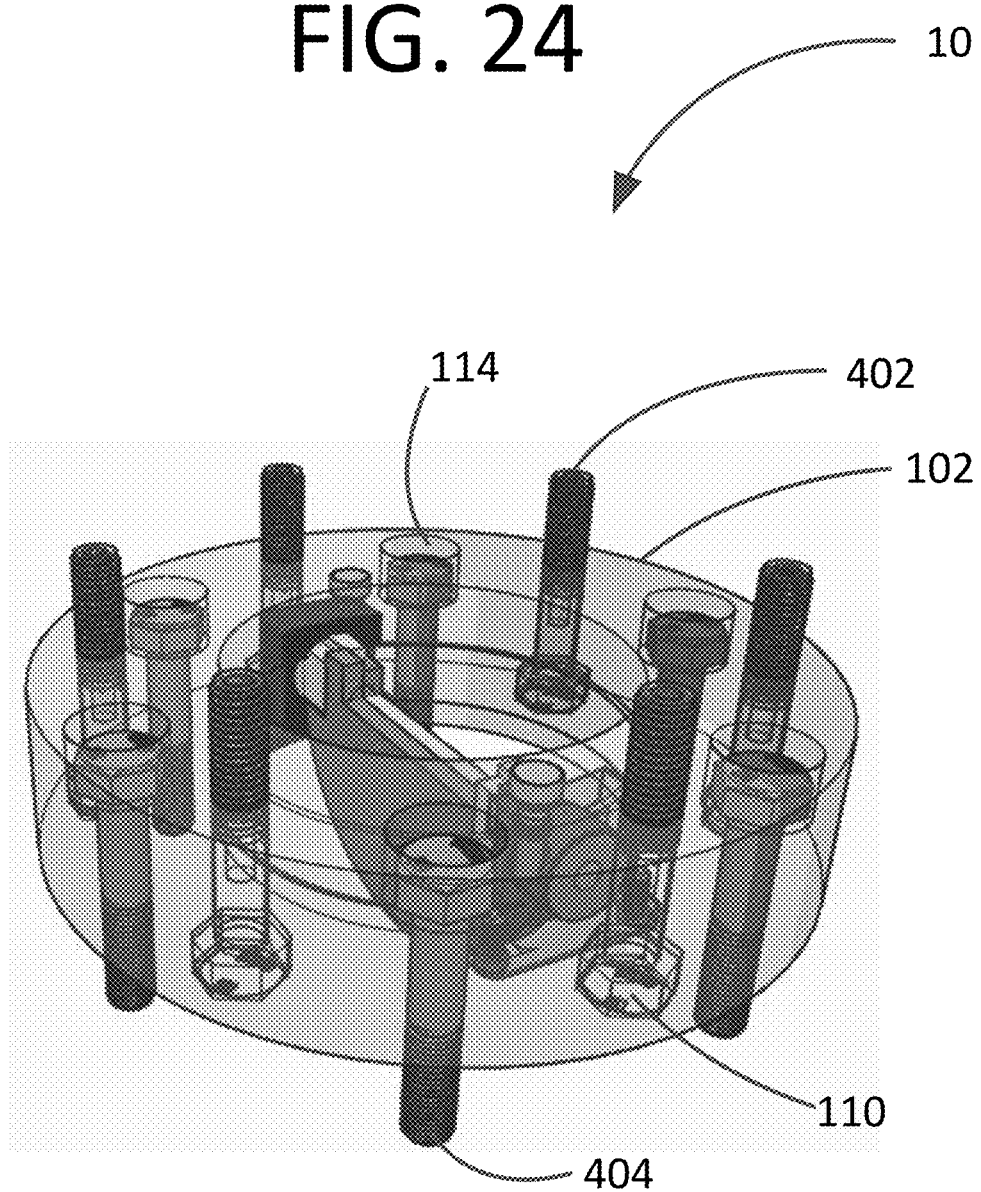
FIG. 24 shows aspects of an attachment assembly according to exemplary embodiments herein.

As shown in FIGS. 3-5, the barrel 102 may include upper mounting flange holes 110 and lower mounting flange holes 114. As shown in FIG. 24, the upper mounting flange holes 110 may receive and house the upper mounting bolts 402, and the lower flange holes 114 may receive and house the lower mounting bolts 404. With the fire hydrant 14 configured with the upper surface of the barrel 102 as described above, it may be preferable that the upper mounting bolts 402, when housed in the upper mounting flange holes 110, align with corresponding openings (threaded and/or inclusive with bolts) on the fire hydrant 14 and that the upper mounting bolts 402 may be received into the corresponding openings and be held securely there within. In this way, the barrel 102 may be secured to the fire hydrant 14. It may be preferable that the junction between the barrel 102 and the hydrant 14 be free of leaks or gaps, and to this end, a gasket between the two may be used.

In addition, with the water main 12 configured with the lower surface of the barrel 102 as described above, it may also be preferable that the lower mounting bolts 404, when housed in the lower mounting flange holes 114, align with corresponding openings (threaded and/or inclusive with bolts) on the water main 12 and that the lower mounting bolts 404 may be received into the corresponding openings and be held securely there within. In this way, the barrel 102 may be secured to the water main 12. It may be preferable that the junction between the barrel 102 and the water main 12 be free of leaks or gaps, and to this end, a gasket between the two may be used.

In one exemplary embodiment hereof, the upper mounting bolts 402 may be break-away bolts. In one preferred implementation, the bolts 402 may include a hollow shaft. In this way, the bolts 402 may break upon the hydrant 14 receiving a sufficient impact (e.g., when an automobile may impact the hydrant 14). When this happens, the bolts 402 may break, the hydrant 14 may become dislocated from the barrel 102 (partially or completely), and the actuation assembly 300 may actuate the valve assembly 200 as described above. The valve plates 402, 404 may close and the barrel 102 may be sealed so that no water may flow from the water main 12 through the barrel 102. It may be preferable that the lower mounting bolts 404 be solid bolts so that they may not be break-away bolts, but this may not be required.

When the bolts 402 may be broken, it can be appreciated that the bolts 402 may require replacement upon reconfiguring the hydrant 14 with the system 10 after any repairs to the hydrant 14 may be performed as required. It can also be seen, that if the bolts 402 extend through the upper mounting flange holes 110 from the bottom surface of the barrel 102 through the barrel 102 and out the top of the barrel 102 as shown in FIG. 24, that in order to replace the bolts 402 the barrel 102 may require removal from the water main 12 to provide access to the bottom surface of the barrel 102. It can be appreciated that this may take extra time and cost extra money.

Figure 25:
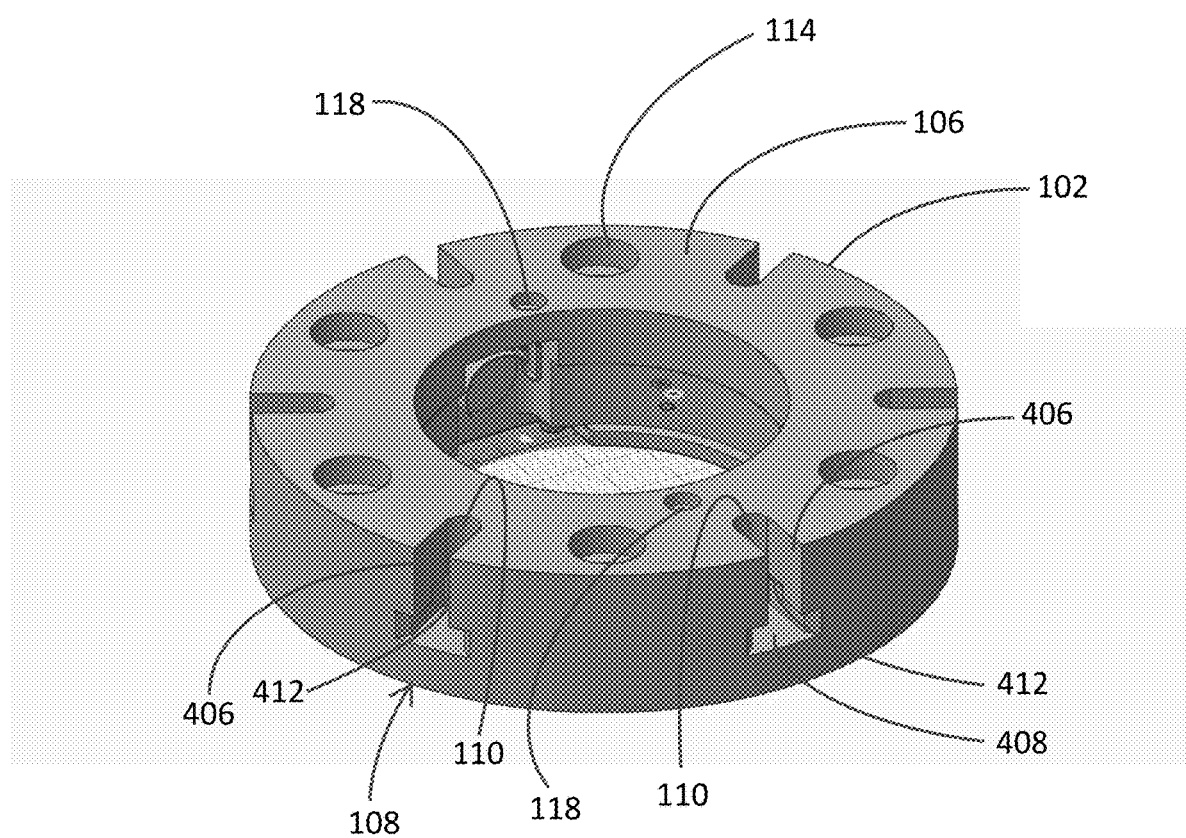
FIGS. 25-26 show aspects of a side bolt slot according to exemplary embodiments herein.
Figure 26:
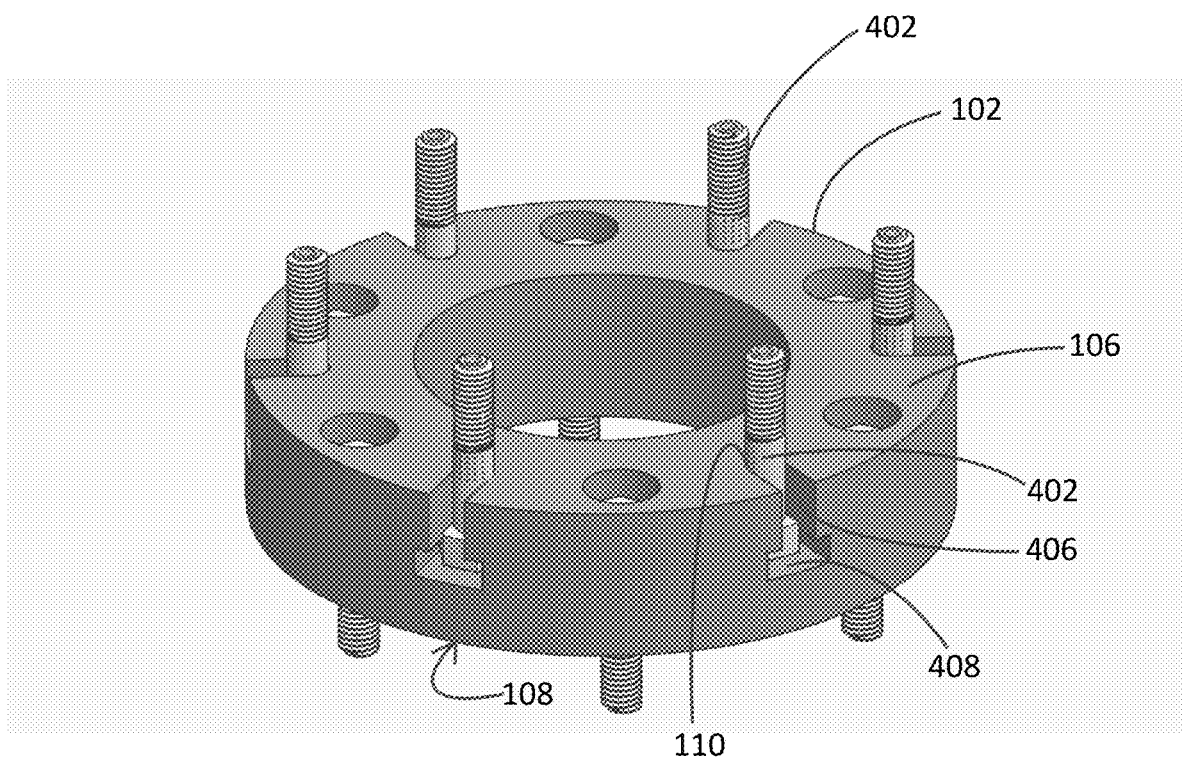

Accordingly, and according to one exemplary embodiment hereof as shown in FIGS. 25 and 26, the upper mounting flange holes 110 in the barrel 102 may include side bolt slots 406. The side bolt slots 406 may extend from the upper mounting flange holes 110 to the side circumferential surface of the barrel 102, and may be of sufficient width to allow the insertion of the upper mounting bolts 402 through the side bolt slots 406 and into the upper mounting flange holes 110.

It may also be preferable that each side bolt slot 406 include a lower portion 408 that may receive and accommodate the head 410 of the bolt 402 to be used with the upper mounting flange hole 110 as shown. Note that this lower portion 408 may be positioned above the bottom surface of the barrel 102 such that the upper mounting flange holes 110 may not pass from the top surface all the way through the barrel 102 to the bottom surface of the barrel 102. In addition, the lower portion 408 may include a width that may generally correspond to the width of the bolt head 410 (measured from flat side to flat side across the bolt head 410) so that the lower portion 408 may receive the head 410 and hold it secure as the bolt 402 is passed into the slot 406.

In this configuration, the bolt 402 may extend from the lower portion 408 of the slot 408 upward through the upper mounting flange hole 110 and out the top of the hole 110. The lower portion 408 may disallow the bolt head 410 from rotating, and therefore, the bolt itself 402 from rotating as well. In this way, when the hydrant 14 is configured with the barrel 102 and the bolts 402 are inserted into the upper mounting flange holes 110 via the side bolt slots 406 and through the corresponding flanges on the bottom surface of the hydrant 14, the bolts 402 may be held secure and nuts may be applied to their upper ends. This may secure the hydrant 14 to the barrel 102. Note that the side bolt slots 406 may be incorporated into the upper mounting flange holes 110 directly so that the junction between the slots 406 and the holes 110 may be seamless.

In addition, and according to one exemplary embodiment hereof, each upper mounting flange hole 110 in combination with its associated side bolt slot 406 with lower portion 408 may include a lower opening upper recess 412 that may be located within the lower portion 408 in the area of the bottom of the upper mounting flange hole 110. The dimensions of each upper recess 412 may be chosen to generally correlate with the dimensions of the head 410 of its associated bolt 402. In this way, when the bolt 402 may be configured within the slot 406 with its head 410 positioned below the upper recess 412, and the bolt 402 may be secured to its associated flange hole on the lower portion of the fire hydrant 14 (via a nut, threads within the flange or by other attachment mechanisms) in order to secure the barrel 102 to the fire hydrant 14, that as the bolt 402 may be tightened within the flange hole in the fire hydrant 14, that the head 410 of the bolt 402 may be lifted upward into the upper recess 412 and be held secure therein. This may further secure the bolt 402 within the flange opening 110 and the recess 412 may thereby prevent the bolt 402 from inadvertently sliding out of position.

It can be seen then, that upon breakage, the broken bolts 402 may be removed by sliding the bolts 402 out of the upper mounting flange holes 110 via the side bolt slots 408. The broken bolts 402 may then be replaced by new bolts 402 by sliding the new bolts 402 into the upper mounting flange holes 110 via the side bolt slots 408. It is understood that this method of replacing the broken bolts 402 via the side bolt slots 408 may not require the removal of the barrel 102 from the water main 12, thus saving time and money.

Note that it may be preferable to shut off the water supply to the water main 12 while reconfiguring the hydrant 14 with the system 10 after an impact event. With no water pressure provided by the water main 12, the front and back valve plates 202, 204 may swing downward (due to gravity) to their lower and open configurations. As this happens, the valve hubs 206, 208 may also rotate such that the keeper pin areas 312, 318 may rotate back towards their associated keeper pins 302. The keeper pins 302 may ride on the valve hubs 206, 208 until the keeper pin areas 312, 318 may be aligned with the keeper pins 302, at which time the keeper pins 302 by drop down into their associated keeper pin slots 314, 320 such that their bottoms 308 may engage with their associated keeper pin slot lower surfaces 316, 322. The hydrant 14 may be attached to the top surface of the barrel 102 and the keeper pins 302 may thereby be secured in their downward positions, thus locking the valve assembly 200 in its open configuration and generally resetting the system 10.

In Use

Figure 28:
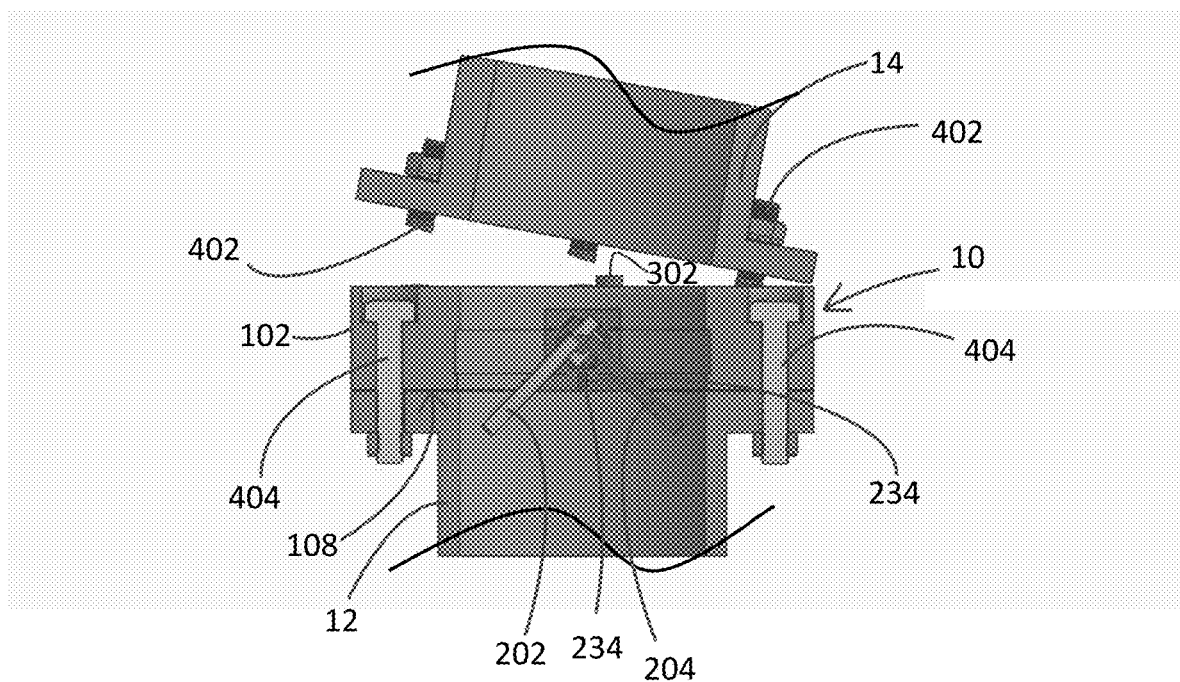

According to one exemplary embodiment hereof as shown in FIGS. 27-29, a method of stopping water flow from a water main 12 into a hydrant 14 upon the dislodgement of the hydrant 14 from the water main 12 may be provided by the use of the system 10.

As shown in FIG. 27, the system 10 may be configured between the water main 12 and the fire hydrant 14 as described in other sections or otherwise. Then, upon dislodgement of the hydrant 14 from the water main 12 (the water main 12 including with the system 10 configured with its top end), the system 10 may begin to actuate and close its valve assembly 200 as shown in FIG. 28. As shown, as the hydrant 14 may move away from the top surface of the barrel 102, the keeper pins 302 may be released and may move upward, subsequently releasing the valve plates 202, 204 from their downward and locked open positions. The upward water pressure provided by the water main 12 into the bottom of the barrel 102 may apply an upward force onto the valve plates 202, 204 that may cause the plates 202, 204 to rotate upward in the direction of the arrows F and G of FIG. 16 respectively.

Then, as shown in FIG. 29, the valve plates 202, 204 may continue to rotate upward into their fully upward and closed positions within the opening 104 of the barrel 102. The upward water pressure provided by the water main 12 into the bottom of the opening 104 may provide a constant upward force on the valve plates 202, 204 and the force may hold the plates 202, 204 in position, with the outer upper edges of the plates 202, 204 abutted against the downward facing surface 124 of the valve sealing surface 122 within the opening 104. In this way, the valve assembly 200 may be sealed closed and no water may be allowed to pass through the barrel 104.

In another exemplary embodiment hereof, referring to FIGS. 30-36 and 40 of the drawings, according to the present invention is a dual plate inversely mounted backflow and breakaway check valve illustrated in different views and generally designated by the reference numeral 10. In the preferred embodiment, the dual plate backflow and breakaway check valve 10 is installed above grade, under wet barrel fire hydrants and/or in line with all kinds of pipe conveying fluids to prevent fluid loss and property damage when fire hydrants and/or pipes are damaged.

Figure 30:
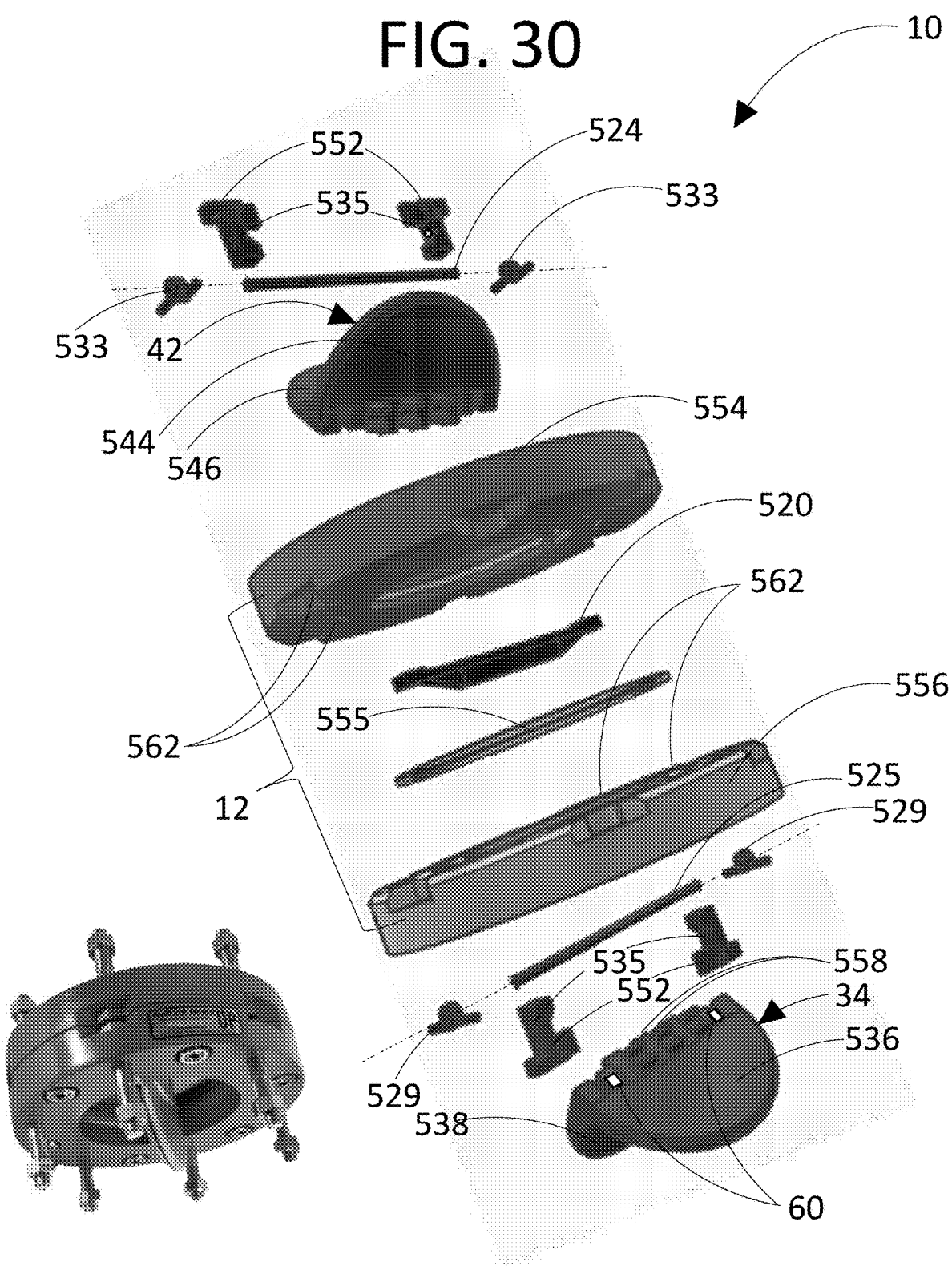
FIG. 30 is an exploded view of a dual plate backflow and breakaway check valve according to the preferred embodiment of the present invention.

Referring to FIG. 30, an exploded view of the dual plate backflow and breakaway check valve 10 is illustrated. The dual plate check valve 10 comprises a top mounting flange 554 and a bottom mounting flange 556. The dual plate check valve 10 further comprises an upper dual valve 42 and a lower dual valve 34. The upper dual valve 42 includes an upper front plate 544 and an upper back plate 546 arranged inside the upper valve holder 552 of the assembly 12 utilizing an upper valve pin 524 and a plurality of upper valve springs 533. The upper valve pin 524 is designed to insert through a plurality of upper valve pin holes 535 of the upper valve holder 552 with the upper valve pin 524, the plurality of upper plate pin holes 535 in 552 and the plurality of upper valve springs 533 firmly lock the upper front plate 544 and an upper back plate 546 inside the upper valve seat 552. The lower dual valve 34 includes a lower front plate 536 and a lower back plate 538 arranged inside the lower valve seat 552 of the assembly 12 utilizing a lower valve pin 525 and a plurality of lower valve springs 529. The lower valve pin 525 is designed to insert through a plurality of lower valve seat pin holes 535. The lower valve pin 525, the plurality of lower valve seat 552 pin holes 535 and the plurality of lower valve springs 529 facilitate fine locking of the lower front plate 536 and a lower back plate 538 inside the lower valve seat 552 of the assembly 12. In this way, the dual plate backflow and breakaway check valve device 10 provides a fast-locking mechanism to prevent a large amount of fluid loss when the fire hydrants and/or pipelines are damaged and/or broken. Lower valve stabilizer tabs 552 are a part of the lower valve seat 52 and upper valve stabilizer tabs 552 are attached inside the upper valve seat 552 of the assembly 12.

Figure 31:
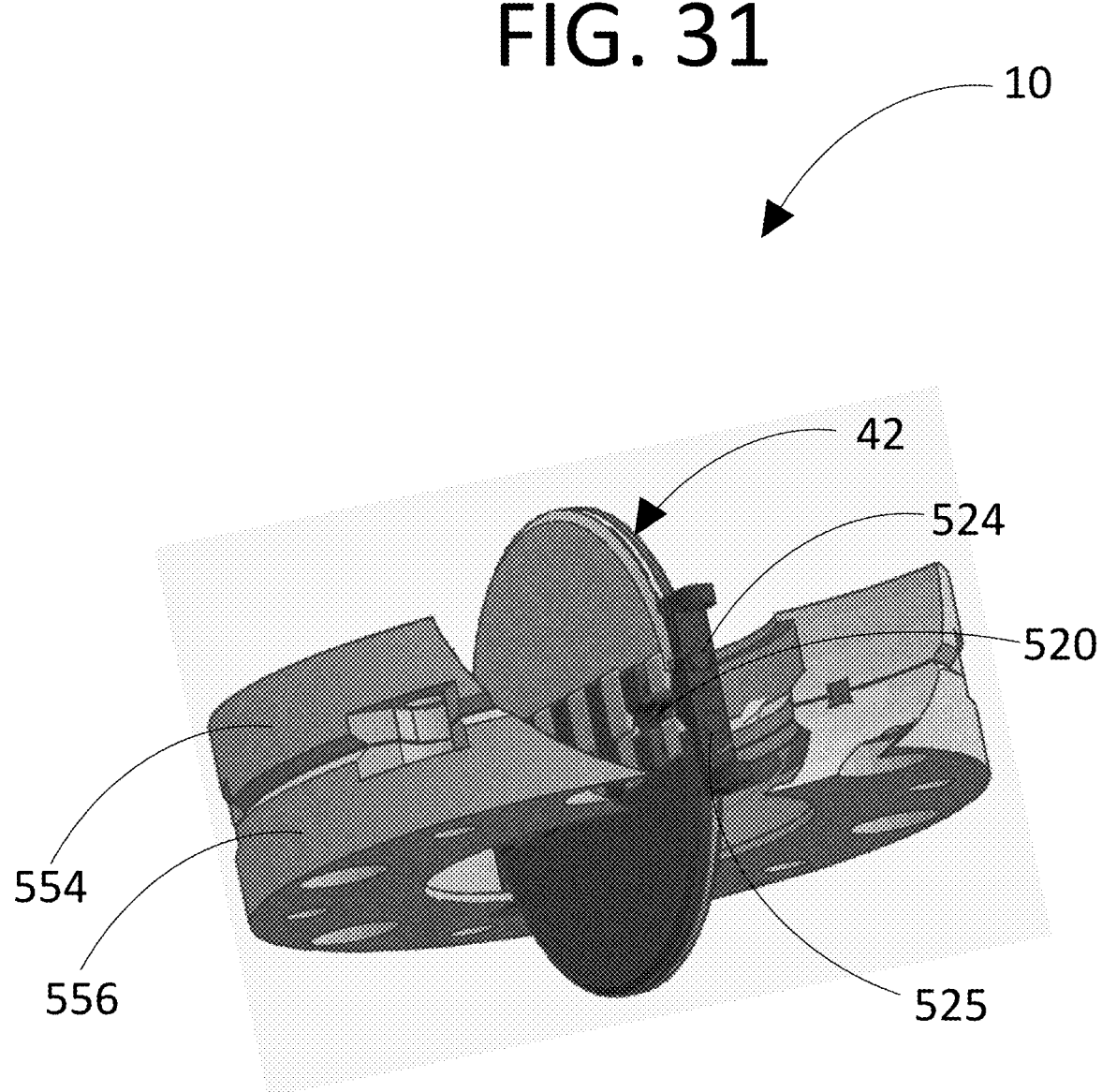
FIG. 31 is a side cut away view of the present invention, illustrating an upper dual valve, a lower dual valve, a top mounting flange and a bottom mounting flange of the dual plate backflow and breakaway check valve.

As shown in FIG. 31, the upper dual valve 42 is inserted into the upper valve seat 552 and the upper portion of the assembly 12 and the lower dual valve 34 is inserted into the lower valve seat 552 and into the lower portion of the assembly 12. A plurality of lower valve stay tabs 558 is attached perpendicularly to the lower front plate 536 and the lower back plate 538 of the lower dual valve 34. A plurality of witness holes 60 is located at the lower front plate 536 and lower back plate 538. A plurality of flange holes 62 is arranged at a circumference of both the top mounting flange 554 and the bottom mounting flange 556. The plurality of flange holes 562 is designed to attach the dual plate check valve 10 under the fire hydrant and/or in line with at least one pipeline. The dual plate check valve 10 further comprises a lower valve keeper bar 520 arranged within the upper valve seat 552 of the assembly 12. The lower valve keeper bar 520 moves up from between the plurality of lower valve stay tabs 558 upon breakage of the breakaway bolts 518 (See FIGS. 37, 38 and 39) thereby allowing the lower front plate 536 and lower back plate 538 to rotate about the lower valve pin 525 and to close the lower dual valve 34 upon an lower valve seat bevel 522 (See FIG. 38). Simultaneously, the upper front plate 544 and the upper back plate 546 rotate about the upper valve pin 524 and close upon an upper barrel bevel 528 (See FIGS. 36 and 38).

The upper front plate 544 and the upper back plate 546 are assembled around the upper valve pin 524 inserted through the plurality of upper valve seat 552 pin holes 535 incorporating the plurality of upper valve springs 533 which keeps the upper dual valve 42 in the closed position against the upper barrel bevel 528 (See FIGS. 36 and 38) during the static and backflow modes of the dual plate backflow and breakaway check valve 10.

Similarly, the lower front plate 536 and the lower back plate 538 are assembled around the lower valve pin 525 inserted through the plurality of lower valve seat pin holes 552 incorporating the plurality of lower valve springs 529 which facilitate the rotation of the lower front plate 536 and lower back plate 538. Upon actuation, the lower valve keeper bar 520 arranged within the upper valve seat 552 is moved away from the plurality of lower valve stay tabs 558 of the lower dual valve 34. This allows the lower dual valve 34 to close upon the lower valve seat bevel 522 (See FIG. 38) and minimizes the surge of fluid while allowing the plurality of witness holes 60 to indicate a stream of effluence 65 (See FIG. 39).

In the preferred embodiment, the plurality of witness holes 560 located at the lower front plate 536 and lower back plate 538 has a diameter of ¼ inch. The location of damage to fire hydrants and pipelines can be indicated and readily visualized by the relatively small size of the witness holes 60. The elevated pressure of the fluid contained within the lower dual valve 34 causes a limited high-pressure stream of effluence 65 (See FIG. 39) to emit from the lower dual valve 34. The witness holes 60 also provide some relief from water hammer generated in a pipeline system at the time of an automatic shutoff. The witness holes 60 can be eliminated on devices installed in line with pipes conveying caustic of explosive fluids.

Figure 32:
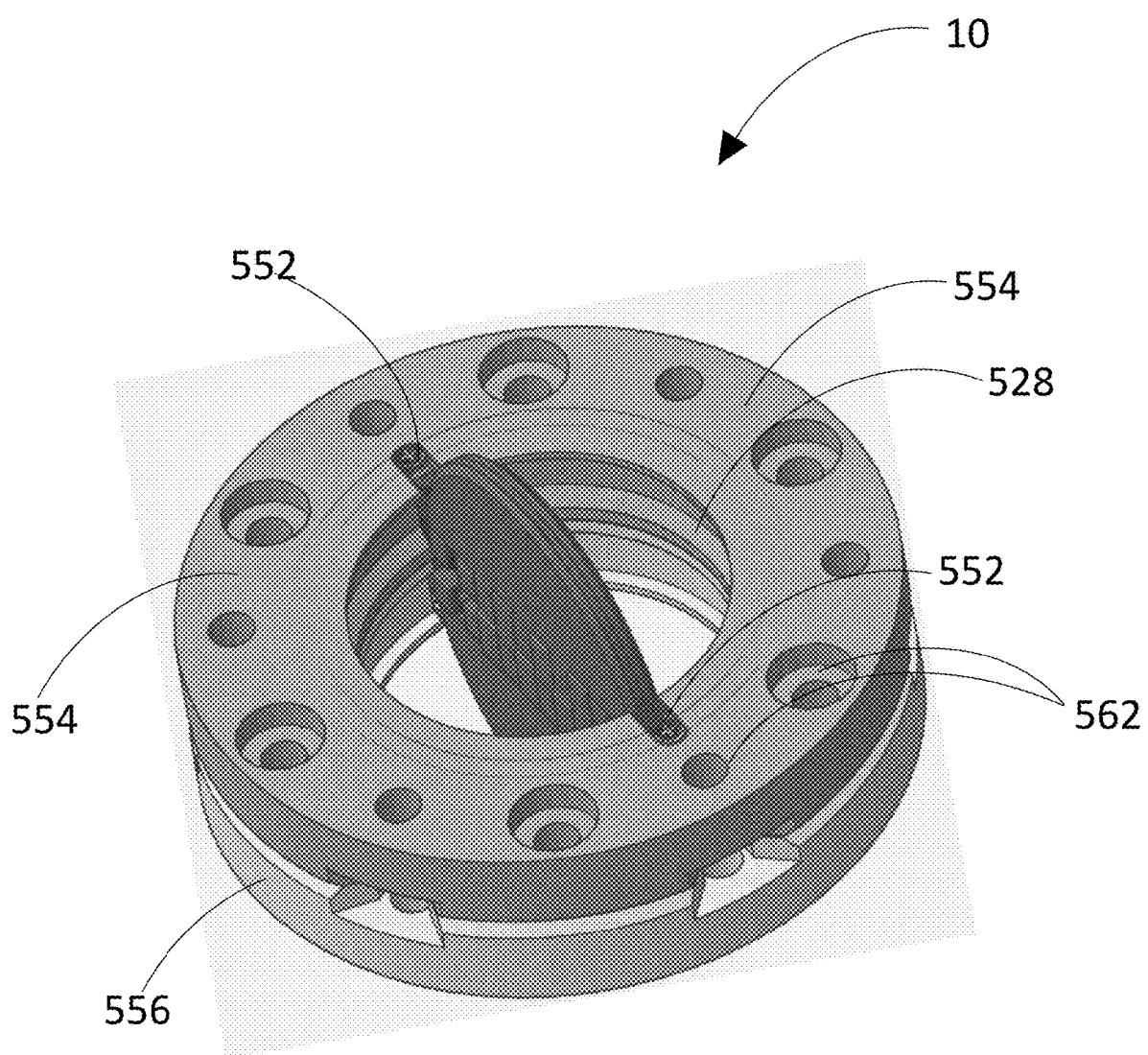
FIG. 32 is a top perspective view of the present invention, illustrating the upper dual valve, the top mounting flange, the bottom mounting flange and a plurality of flange holes of the dual plate backflow and breakaway check valve.
Figure 33:
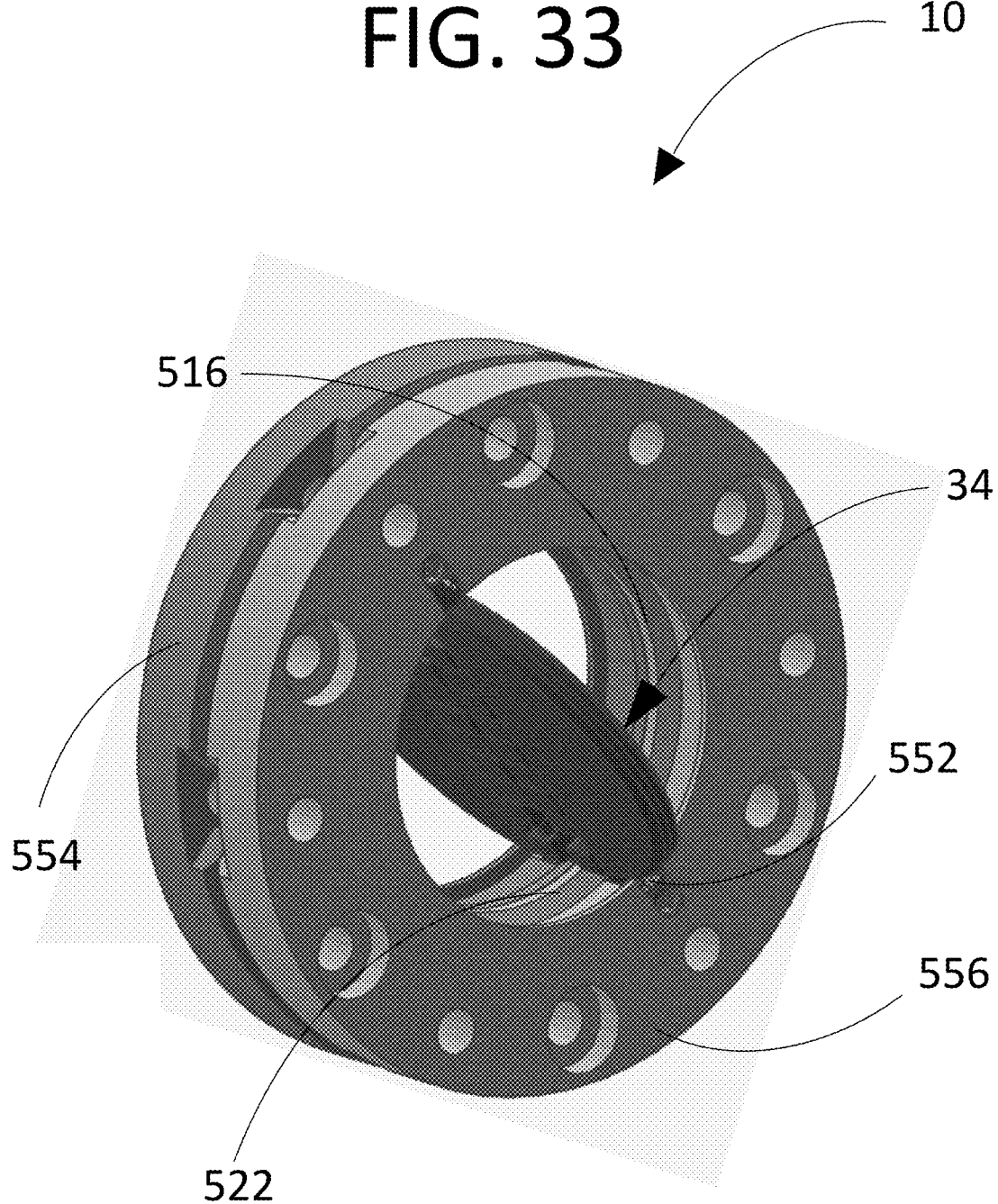
FIG. 33 is a bottom perspective view of the present invention, illustrating the upper dual valve, a lower valve keeper bar and an upper valve stabilizer bar of the dual plate backflow and breakaway check valve.
Figure 34:
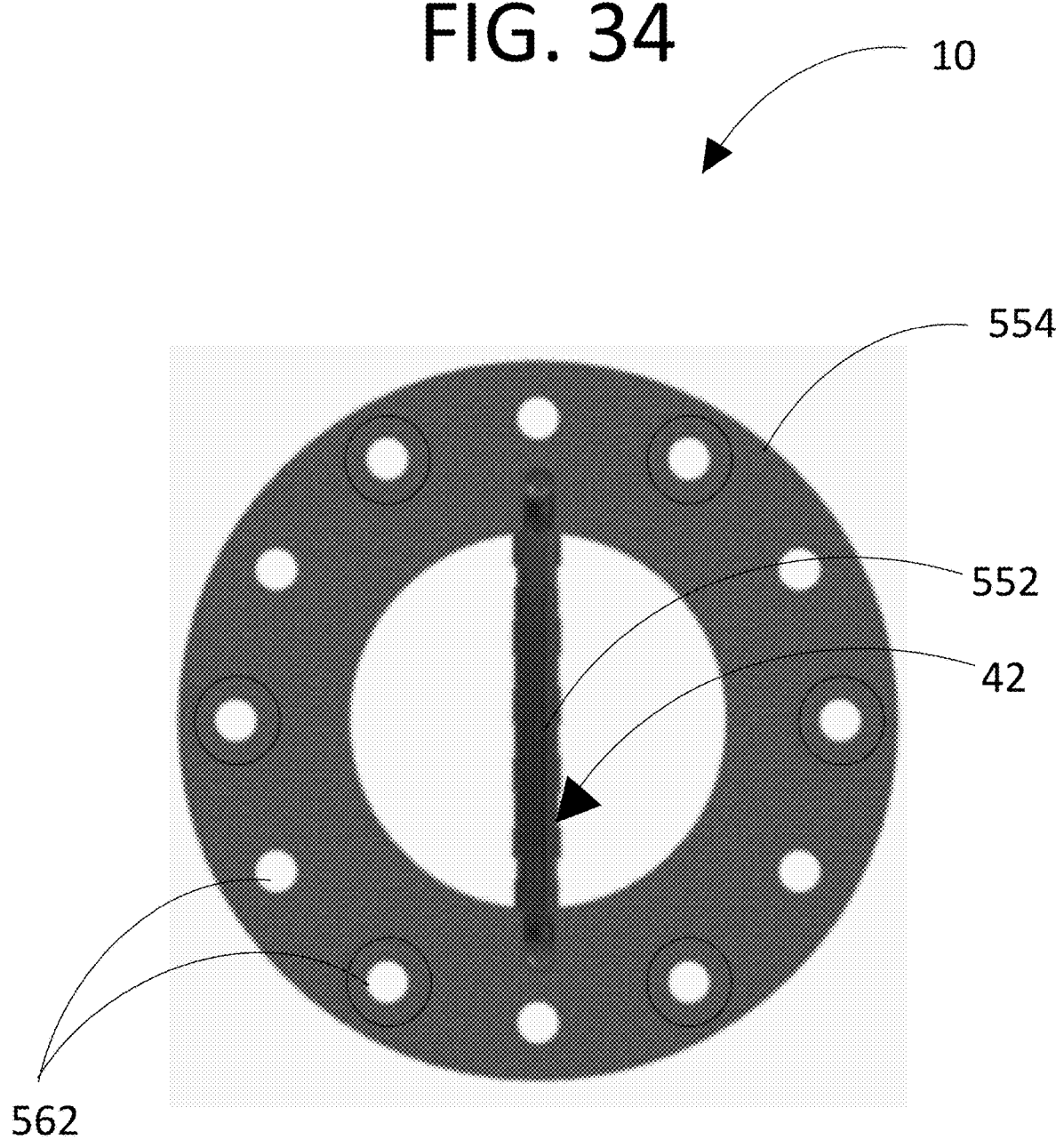
FIG. 34 is the top plan view of the present invention, illustrating the upper and lower dual valves of the dual plate backflow and breakaway check valve in an open position.

Referring to FIGS. 32-34, the top mounting flange 554 is attached to an upper valve seat 552 and the lower mounting flange 556 is attached to a lower valve seat 516. The lower dual valve 34 is arranged inside of the lower valve seat 516 utilizing the lower valve pin 525 and the upper dual valve 42 is arranged inside of the upper valve seat 514 utilizing the upper valve pin 524. The lower valve keeper bar 520 is arranged within the upper valve seat of the assembly 14.

Figure 35:
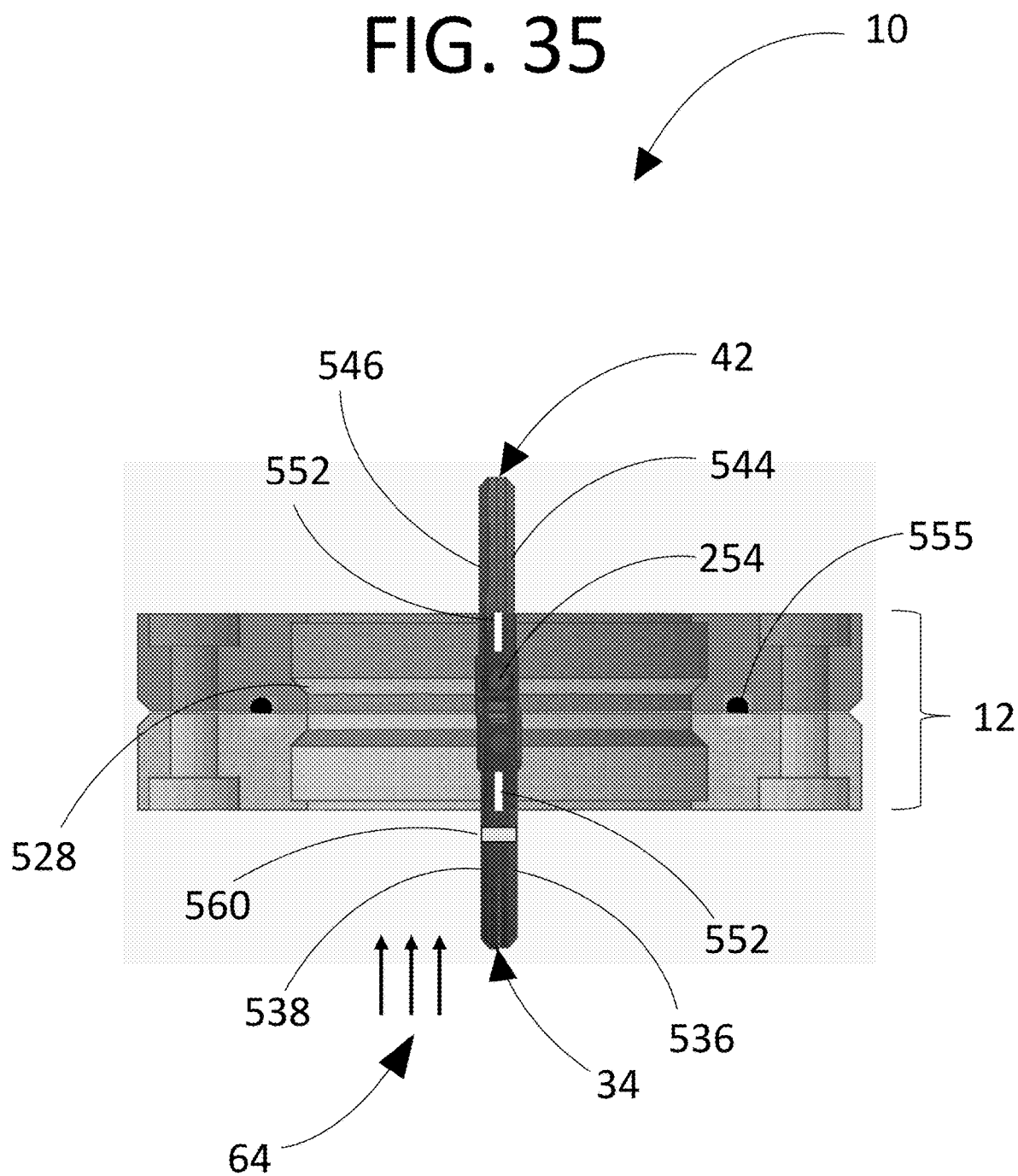
FIG. 35 is a front cross-sectional view of the present invention, illustrating the dual plate backflow and breakaway check valve in a normal flow mode.

FIG. 35 is the top plan view of the present invention, illustrating the upper dual valve 42 in an open position. The lower valve stabilizer bar 550 (See FIG. 7B) and the upper valve stabilizer tab 552 (See FIG. 37B) prevents the upper and lower dual valves 42 & 34 from rotating more than 90 degrees.

Figure 36:
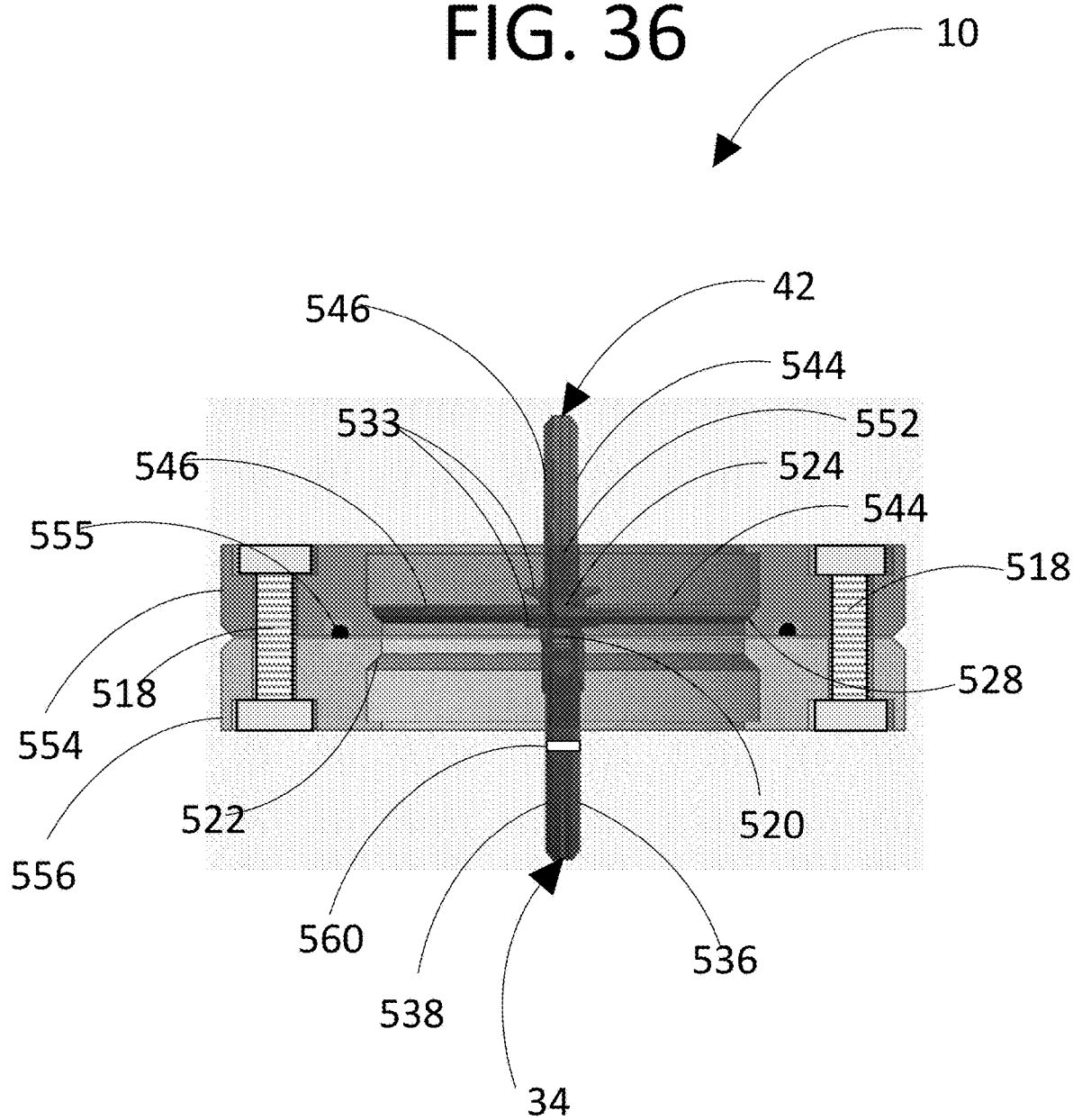
FIG. 36 is a front cross-sectional view of the present invention, illustrating the dual plate backflow and breakaway check valve in a static and flow mode.

FIG. 36 is a front cross-sectional view of the present invention, illustrating the dual plate check valve 10 in a normal flow mode. In a normal fluid flow mode, the fluid flowing through the dual plate check valve 10 causes the upper front plate 544 and the upper back plate 546 to open up to a 90 degree angle away from the upper valve bevel 528 by rotating around the upper valve pin 524 that is connected to the upper pin mounting holes 535 (See FIG. 31). The upper valve stabilizer tabs 552 prevents the upper front plate 544 and the upper back plate 546 of the upper dual valve 42 from rotating more than 90 degrees. In the normal flow mode, the upper dual valve 42 and the lower dual valve 34 are in the open position to permit the flow of fluids 64 (See FIG. 36). The witness holes 60 located at the lower front plate 536 and the lower back plate 538 allows the dual stream of effluence 65 (See FIG. 39) to be visible upon activation of the assembly 12.

Figure 37:
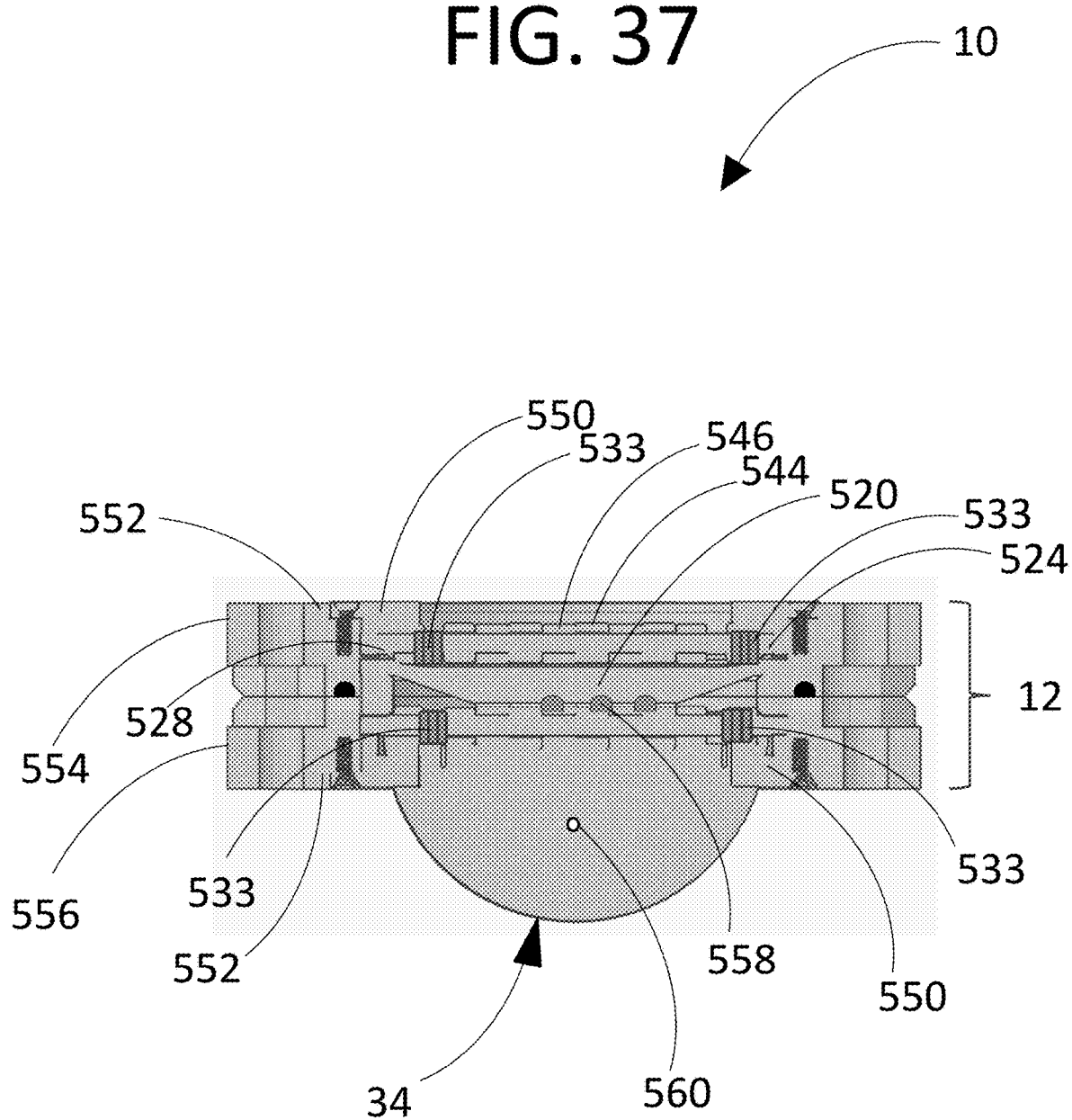
FIG. 37 is a side cross-sectional view of the present invention, illustrating the dual plate backflow and breakaway check valve in the static flow mode.

FIG. 37 illustrates front and side cross-sectional views of the present invention, illustrating the dual plate check valve 10 in a static and flow mode. In the static flow mode, such as when the dual plate check valve 10 is used in conjunction with a wet barrel fire hydrant and/or pipeline, the upper dual valve 42 remains closed due to its spring-loaded feature caused by the plurality of upper valve springs 533 (See FIG. 37). The plurality of upper valve springs 533 keeps the upper dual valve 42 in a closed position upon the upper valve seat bevel 528 when there is no flow of fluid. In the closed position, the upper dual valve 42 functions as a backflow preventer which minimizes the insertion of unwanted agents into the fluid through the fire hydrant and/or pipeline. The lower dual valve 34 is kept in an open position utilizing the lower valve seat keeper bar 520 that moves away with the upper valve holder 552 upon breakage of the breakaway bolts 518 (See FIG. 37). The lower valve stabilizer tabs 550 prevents the lower front plate 536 and the lower back plate 538 from rotating in the wrong direction when the lower valve keeper bar 520 arranged within the upper valve seat 552 moves away upon the shearing of the breakaway bolts 518 (See FIGS. 37, 38 & 39). The witness holes 60 located at the lower front plate 536 and lower back plate 538 creates a dual warning stream of effluence 65 (See FIG. 39) upon damage to the fire hydrant and/or pipeline. These witness holes 60 can be plugged or eliminated if and when pipes carry caustic and/or flammable liquids.

As shown in FIG. 37, the upper front plate 544 and upper back plate 546 are assembled around the upper valve pin 524 that is inserted through the upper pin mounting holes 535 (See FIG. 31) incorporating the upper valve springs 533 which keeps the upper dual valve 42 in the closed position against the upper barrel bevel 528 during the static flow mode. The upper pin mounting hole 535 (See FIG. 31) located at the upper valve seat 552 connects the upper dual valve 42 and the upper valve seat 552 of the upper assembly 554 together. The lower pin mounting hole 540 (See FIG. 31) located at the lower valve seat 552 connects the lower dual valve 34 and the lower flange 556 of the assembly 12 (See FIG. 37) together, which facilitates the rotation of the lower front plate 536 (See FIG. 31) and the lower back plate 358 (See FIG. 31). Upon actuation, the lower valve keeper bar 520 is moved away from the lower valve stay tabs 558 (See FIG. 37) of the lower dual valve 34. This allows the lower dual valve 34 to close upon the lower valve seat bevel 522 (See FIG. 38) and minimizes the surge of fluids.

Figure 38:
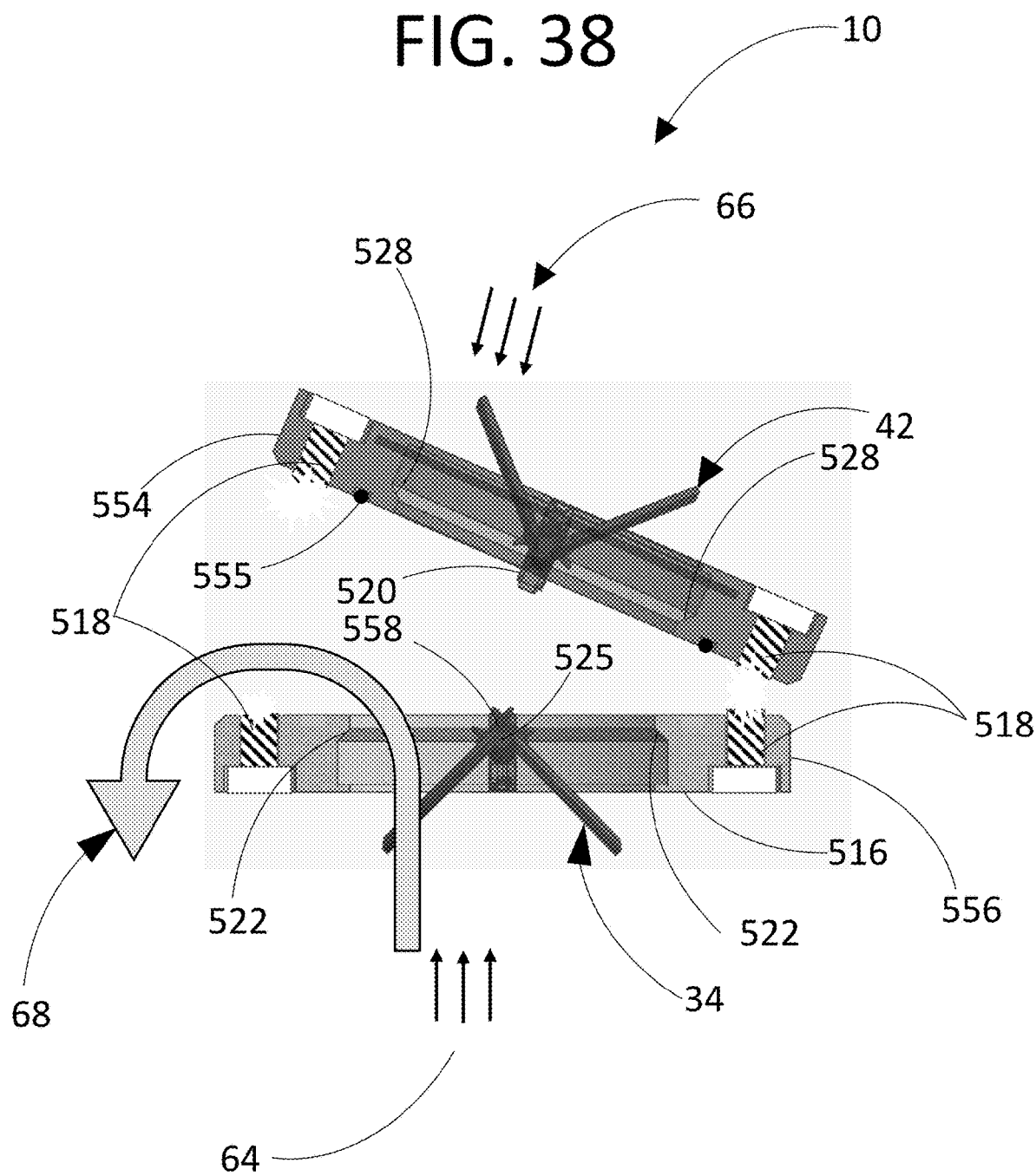
FIG. 38 is a side cross-sectional view of the present invention, illustrating the dual plate backflow and breakaway check valve in a partially deployed flow mode.

FIG. 38 is a side cross-sectional view of the present invention, illustrating the dual plate check valve 10 in a partially deployed mode. During the partially deployed mode, the lower valve keeper bar 520 moves away upon breakage of the breakaway bolts 518 freeing the plurality of lower valve stay tabs 558 of the lower dual valve 34 which can then open when the lower dual valve 34 rotates 90 degree around the lower valve pin 525. Thus, the lower dual valve 34 can seat on the lower flange bevel 522 of the lower flange 556 and stops the flow of fluid 64. Due to the quick closure of the upper dual valve 42 and lower dual valve 34, a minimal fluid loss 64 is resulted. The upper dual valve 42 starts to close due to the loss in pressure and fluid flow 64 thereby preventing the loss of fluids from the unpressurized portion of the pipeline. A reverse fluid back flow 66 caused by the breakage of the breakaway bolts 518 assists the upper dual valve 42 in its closure state upon the upper valve seat bevel 528.

Figure 39:
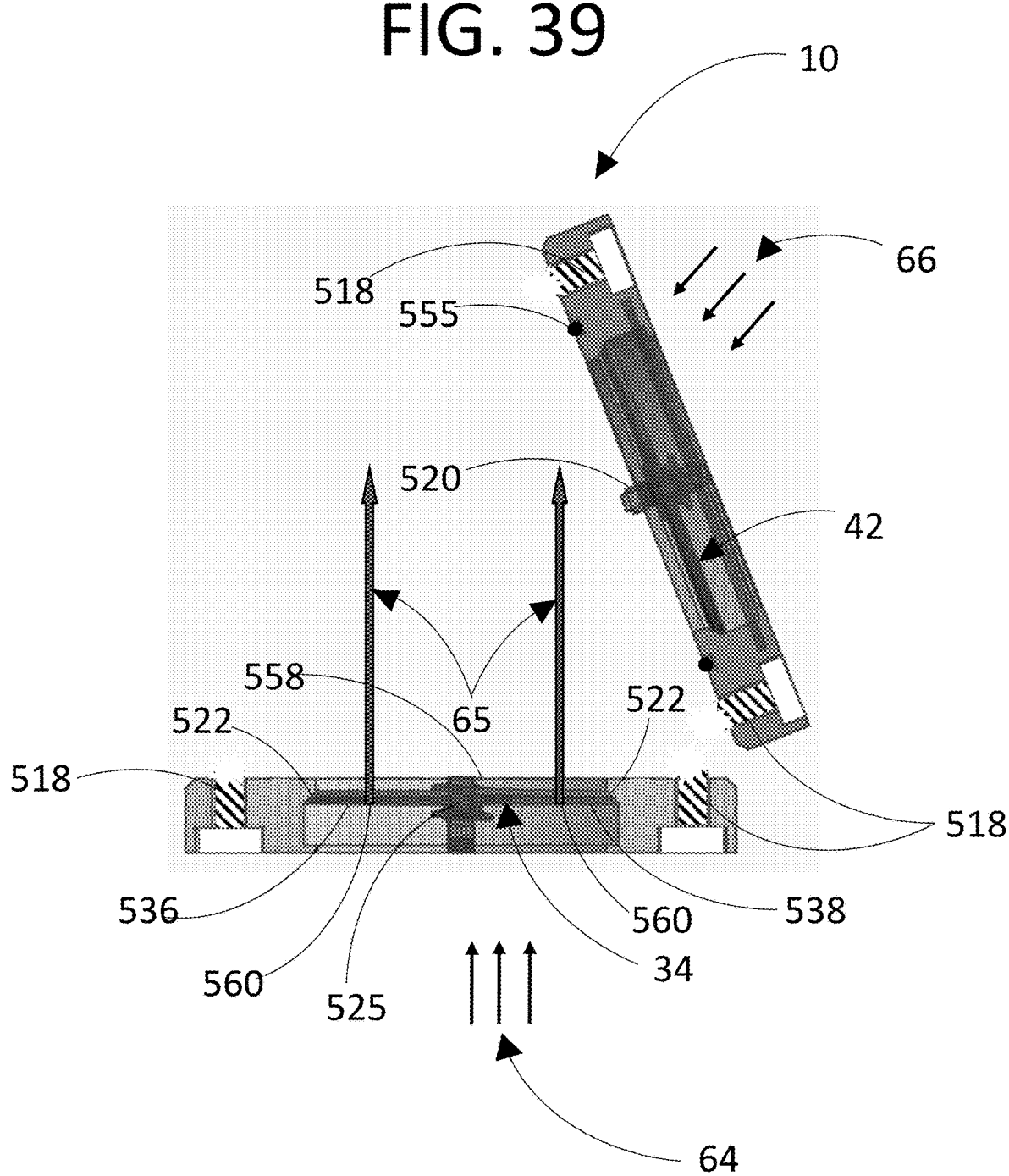
FIG. 39 is a side cross-sectional view of the present invention, illustrating the dual plate backflow and breakaway check valve in a fully deployed stop flow mode.

FIG. 39 is a side cross sectional view of the present invention, illustrating the dual plate check valve 10 in fully-deployed flow mode. The lower valve keeper bar 520 moves out from position upon the breakage of the breakaway bolts 518 freeing the plurality of the lower valve stay tabs 558 and allowing the lower dual valve 34 to close upon the lower valve seat bevel 522. During the fully deployed flow mode, the lower dual valve 34 achieves the 90-degree rotation around the lower valve pin 525 due to the fluid flow 64 which is permitted by the displacement of the lower valve keeper bar 520. The upper dual valve 42 remains closed due to the residual back pressure of fluid 66 causing the streams of effluence 65 to be visible through the witness holes 60 in the lower front plate 536 and lower back plate 538 of the lower dual valve 34 due to the fluid pressure 64. The witness holes 60 can be plugged or eliminated if and when pipes carry caustic and/or flammable liquids. In the dual plate backflow and breakaway check valve 10, any type of pipe conveying any type of fluid therein, such as water, crude oil, refined petroleum in all its forms and any other liquids requires no modification to the pipe itself, only the attachment to the valve in a particular area where the pipe may be susceptible to damage and breakage.

The dual plate check valve 10 may be of various diameters and may contain various fluids under pressures ranging between 50 and 150 pounds per square inch. Furthermore, the source of fluid pressure is assumed to have a large capacity such that the fluid flow pressure does not decrease over time, particularly within the timeframe of an automatic closing condition. The lower dual valve 34 which acts as a shutoff valve is arranged in a controlled manner so as to rotate to the closing position to ensure that initial closing results in substantially complete shutoff of fluid flow through the lower dual valve 34. The sudden breakage of the breakaway bolts 518 and the automatic shut off of the lower dual valve 34 and the upper dual valve 42 reduces further damage to wet barrel fire hydrants and/or pipelines conveying fluids of all types.

Figure 10:
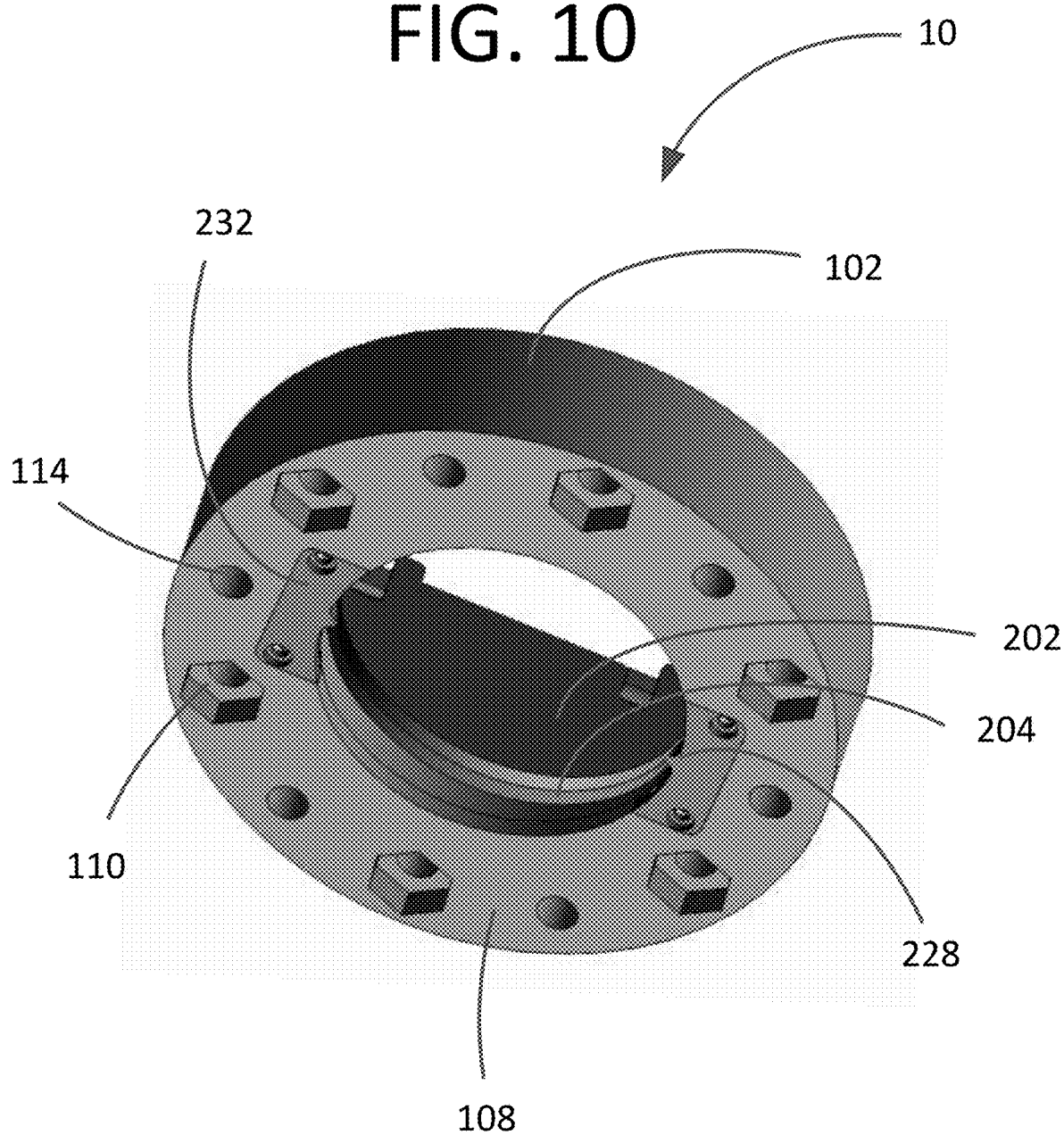
FIGS. 10-18 show aspects of a valve assembly configured with a housing assembly according to exemplary embodiments herein.

FIG. 10 is an isometric view of another embodiment of the above grade back flow and surge protection shear valve that can be alternatively configured into or attached to a device 70 providing a sensing device, which incorporates electronic devices 72 which detects water pressure, quality, motion, cameras and transmitting devices under all types of wet barrel fire hydrants and in line with pipes conveying fluids.

Figure 40:
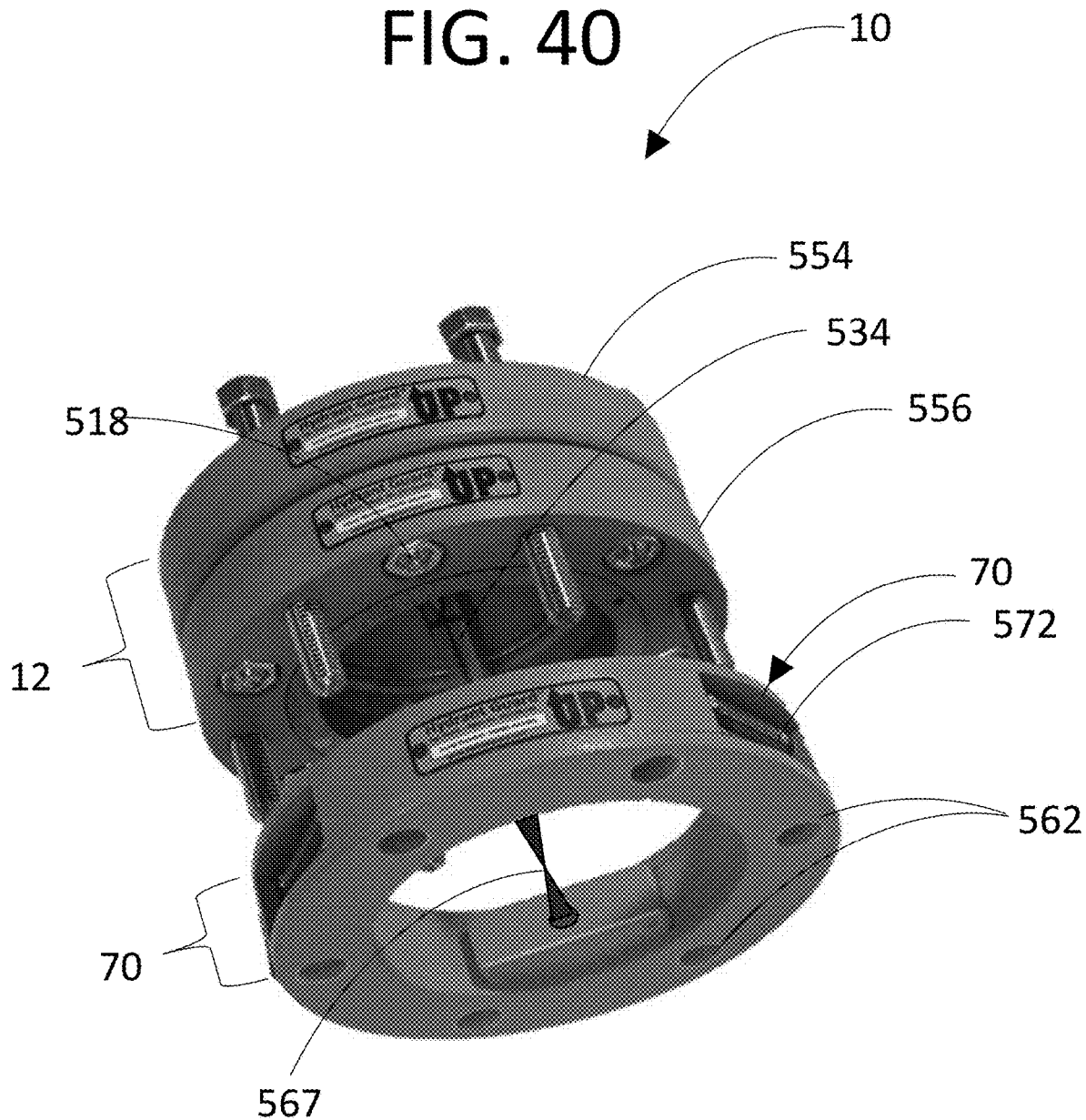
FIG. 40 is an isometric view of another embodiment of the present invention, illustrating a sensing ring device which incorporates electronic sensors which detects water pressure, quality, motion, cameras and transmitting devices in conjunction with the preferred embodiment of the present invention.

As shown in FIG. 40, the lower flange 70 is incorporated with electronic sensing devices 572 into the flange 70. The shedder bar 567 has a paddle design which activates and spins when there is fluid flow. Thus, the fluid flows inside the assembly 70 and causes the spinning of the shedder bar 567. This spinning generates an alternative magnetic force, which can be picked up by a sensor mounted on the outside of the assembly 70. This provides power whereby the sensor produces a warning signal which can be monitored by a local utility in case of breakage and actuation of the lower dual valve 34.

An advantage of the present invention is that the dual plate check valve 10 provides an emergency warning system to alert individuals when the wet barrel fire hydrants and/or pipelines are damaged. Another advantage of the present invention is that the dual plate check valve 10 is easy to install under the fire hydrant and/or pipeline and can be reinstalled or replaced under an existing fire hydrant and/or pipeline. Yet another advantage of the of the present invention is that dual plate check valve 10 minimizes the vehicular damages as well as decreases damage caused by the inundation of fluids.

It is understood by a person of ordinary skill in the art that any and/or all of the aspects of any of the above described embodiments may be combined in any way, and that the system 10 is not limited in any way by any combination of the aspects of any exemplary embodiments.

While a particular form of the invention has been illustrated and described, it will be apparent that various modifications can be made without departing from the spirit and scope of the invention. Accordingly, it is not intended that the invention be limited, except as by the appended claims.

Those of ordinary skill in the art will appreciate and understand, upon reading this description, that embodiments hereof may provide different and/or additional advantages, and that not all embodiments or implementations need have all advantages.

A person of ordinary skill in the art will understand, that any method described above or below and/or claimed and described as a sequence of steps is not restrictive in the sense of the order of steps.

Where a process is described herein, those of ordinary skill in the art will appreciate that the process may operate without any user intervention. In another embodiment, the process includes some human intervention (e.g., a step is performed by or with the assistance of a human).

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, term "at least one" should be understood as meaning "one or more", and therefore includes both embodiments that include one or multiple components. Furthermore, dependent claims that refer to independent claims that describe features with "at least one" have the same meaning, both when the feature is referred to as "the" and "the at least one".

As used in this description, the term "portion" means some or all. So, for example, "A portion of X" may include some of "X" or all of "X". In the context of a conversation, the term "portion" means some or all of the conversation.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first," "second," and so on, in the description and claims, are used to distinguish or identify, and not to show a serial or numerical limitation. Similarly, letter labels (e.g., "(A)", "(B)", "(C)", and so on, or "(a)", "(b)", and so on) and/or numbers (e.g., "(i)", "(ii)", and so on) are used to assist in readability and to help distinguish and/or identify, and are not intended to be otherwise limiting or to impose or imply any serial or numerical limitations or orderings. Similarly, words such as "particular," "specific," "certain," and "given," in the description and claims, if used, are to distinguish or identify, and are not intended to be otherwise limiting.

As used herein, including in the claims, the terms "multiple" and "plurality" mean "two or more," and include the case of "two." Thus, e.g., the phrase "multiple ABCs," means "two or more ABCs," and includes "two ABCs." Similarly, e.g., the phrase "multiple PQRs," means "two or more PQRs," and includes "two PQRs."

The present invention also covers the exact terms, features, values and ranges, etc. in case these terms, features, values and ranges etc. are used in conjunction with terms such as about, around, generally, substantially, essentially, at least etc. (i.e., "about 3" or "approximately 3" shall also cover exactly 3 or "substantially constant" shall also cover exactly constant).

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

Use of exemplary language, such as "for instance", "such as", "for example" ("e.g.,") and the like, is merely intended to better illustrate the invention and does not indicate a limitation on the scope of the invention unless specifically so claimed.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. A system for controlling a valve assembly, the system comprising:
    a housing with an upper side and a lower side and a central opening extending from the upper side to the lower side;
    a first valve plate configured within the central opening and including a first hub, the first hub including a first opening and a first outer circumferential surface opposite the first opening and a first alignment pin received within the first opening, the first valve plate and the first hub axially rotatable about the first alignment pin;
    a first slot surface configured in the first outer circumferential surface of the first hub;
    a first elongate keeper pin including a first end portion and a second end portion and adapted to transition from a locked position to an unlocked position, wherein the locked position includes the first end portion engaged with the first slot surface, and the unlocked position includes the first end portion above from the first slot surface;
    wherein the valve assembly is open with the first keeper pin in its locked position and closed with the first keeper pin in its unlocked position.

2. The system of claim 1 wherein the housing includes an outer sidewall extending from the upper side to the lower side, the housing including at least one channel extending from the outer sidewall towards the central opening and from the upper side towards the lower side, wherein the at least one channel includes an inner surface opposing the upper side, and wherein the at least one channel is adapted to receive a first bolt with a threaded end and to secure the first bolt with at least a portion of the threaded end extending through a channel of the at least one channel and outward from the upper side of the housing.

3. A system for controlling a valve assembly, the system comprising:
    a housing with an upper side and a lower side, and a central opening extending from the upper side to the lower side;
    a first valve plate configured within the central opening and including a first hub, the first hub including a first opening and a first outer circumferential surface opposite the first opening and a first alignment pin received within the first opening, the first valve plate and the first hub axially rotatable about the first alignment pin;
    a first slot surface configured in the first outer circumferential surface of the first hub;
    a first keeper pin including a first end and a second end and adapted to transition from a locked position to an unlocked position, wherein the locked position includes the first end releasably abutted with the first slot surface, and the unlocked position includes the first end separated from the first slot surface;
    wherein the valve assembly is open with the first keeper pin in its locked position and closed with the first keeper pin in its unlocked position.

4. The system of claim 3 wherein the second end of the first alignment pin is flush with the upper side when the first alignment pin is in its locked position and above the upper side when in its unlocked position.

5. The system of claim 3 further comprising a second valve plate configured within the central opening and including a second hub, the second hub including a second opening and a second outer circumferential surface opposite the second opening and a second alignment pin received within the second opening, the second valve plate and the second hub axially rotatable about the second alignment pin.

6. The system of claim 5 wherein the second alignment pin is distinct from the first alignment pin.

7. The system of claim 5 further comprising a second slot surface configured in the second outer circumferential surface of the second hub, and a second keeper pin including a first end and a second end and adapted to transition from a locked position to an unlocked position, wherein the locked position includes the first end of the second keeper pin abutted with the second slot surface, and the unlocked position includes the first end of the second keeper pin separated from the second slot surface.

8. The system of claim 7 wherein the valve assembly is open with the second keeper pin in its locked position and closed with the second keeper pin in its unlocked position.

9. The system of claim 7 wherein the second end of the second alignment pin is flush with the upper side when the second alignment pin is in its locked position and above the upper side when in its unlocked position.

10. The system of claim 7 wherein the second valve plate and the second hub are free to rotate about the second alignment pin when the second keeper pin is in its unlocked position.

11. The system of claim 3 wherein the housing includes an outer sidewall extending from the upper side to the lower side, the housing including at least one channel extending from the outer sidewall towards the central opening and from the upper side towards the lower side.

12. The system of claim 11 wherein the at least one channel includes an inner surface opposing the upper side.

13. The system of claim 12 wherein the at least one channel is adapted to receive a first bolt with a threaded first end and a second end including a bolt head, wherein the at least one channel is adapted to receive the first bolt and to secure the first bolt with at least a portion of the threaded first end extending through a channel of the at least one channel and outward from the upper side of the housing and with at least a portion of the bolt head abutted the inner surface of the at least one channel.

14. The system of claim 11 wherein the at least one channel is adapted to receive a first bolt with a threaded end and to secure the first bolt with at least a portion of the threaded end extending through a channel of the at least one channel and outward from the upper side of the housing.

15. The system of claim 14 wherein the portion of the threaded end of the first bolt extending through the channel of the at least one channel and outward from the upper side of the housing is adapted to connect the upper side of the housing to a separate passageway.

16. The system of claim 15 wherein the separate passageway when connected to the upper side of the housing holds the first keeper pin in its locked position.

17. The system of claim 16 wherein the separate passageway when disconnected from the upper side of the housing releases the first keeper pin into its unlocked position.

18. The system of claim 17 wherein the first valve plate and the first hub are free to rotate about the first alignment pin when the first keeper pin is in its unlocked position.

* * * * *